(12) United States Patent
Jindal et al.

(10) Patent No.: US 12,174,913 B2
(45) Date of Patent: Dec. 24, 2024

(54) PARAMETERIZED NEIGHBORHOOD MEMORY ADAPTATION

(71) Applicant: International Business Machines Corporation, Armonk, NY (US)

(72) Inventors: Ishan Jindal, San Jose, CA (US); Yunyao Li, San Jose, CA (US); Siddhartha Brahma, San Jose, CA (US); Huaiyu Zhu, Fremont, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 910 days.

(21) Appl. No.: 17/244,480

(22) Filed: Apr. 29, 2021

(65) Prior Publication Data

US 2022/0366188 A1    Nov. 17, 2022

(51) Int. Cl.
| | |
|---|---|
| *G06F 40/00* | (2020.01) |
| *G06F 18/214* | (2023.01) |
| *G06F 18/2413* | (2023.01) |
| *G06F 40/30* | (2020.01) |
| *G06V 30/262* | (2022.01) |

(52) U.S. Cl.
CPC .... *G06F 18/2148* (2023.01); *G06F 18/24147* (2023.01); *G06F 40/30* (2020.01); *G06V 30/274* (2022.01)

(58) Field of Classification Search
CPC .......... G06F 18/2148; G06F 40/30; G06F 18/24147; G06V 30/274
See application file for complete search history.

(56) References Cited

U.S. PATENT DOCUMENTS

| | | | |
|---|---|---|---|
| 9,842,105 B2 | 12/2017 | Bellegarda | |
| 10,115,055 B2 | 10/2018 | Weiss et al. | |
| 10,289,952 B2 | 5/2019 | Das et al. | |
| 11,507,746 B2* | 11/2022 | Okura | G06V 30/414 |
| 2011/0087670 A1* | 4/2011 | Jorstad | G06F 40/284 |
| | | | 707/E17.011 |
| 2014/0236578 A1 | 8/2014 | Malon et al. | |

(Continued)

FOREIGN PATENT DOCUMENTS

WO    2020001373 A1    1/2020

OTHER PUBLICATIONS

Fitzgerald et al., "Semantic Role Labeling with Neural Network Factors," Proceedings of the 2015 Conference on Empirical Methods in Natural Language Processing, 2015, 11 pages.

(Continued)

*Primary Examiner* — Barbara M Level
(74) *Attorney, Agent, or Firm* — Amin, Turocy & Watson, LLP

(57) ABSTRACT

Systems and techniques that facilitate parameterized neighborhood memory adaptation for semantic role labeling are provided. In various embodiments, a system can comprise a receiver component that can access a semantic role labeling model trained on a training dataset. In various aspects, the system can further comprise an execution component that can retrain a labeler of the semantic role labeling model based on a set of neighborhood parameters learned from the training dataset. In various instances, the execution component can execute, after retraining, the semantic role labeling model on an inputted sentence.

20 Claims, 16 Drawing Sheets

(56) References Cited

U.S. PATENT DOCUMENTS

| | | | | |
|---|---|---|---|---|
| 2017/0286397 | A1* | 10/2017 | Gonzalez | G06F 40/211 |
| 2018/0225281 | A1* | 8/2018 | Song | G06N 5/02 |
| 2019/0043379 | A1 | 2/2019 | Yuan et al. | |
| 2020/0097809 | A1 | 3/2020 | Velasco et al. | |
| 2021/0081613 | A1* | 3/2021 | Begun | G06F 40/117 |
| 2021/0334475 | A1* | 10/2021 | He | G06N 20/00 |
| 2021/0374347 | A1* | 12/2021 | Yang | G06F 40/295 |
| 2023/0267285 | A1* | 8/2023 | Wu | G06F 40/166 704/2 |
| 2024/0203003 | A1* | 6/2024 | Bera | G06F 40/40 |

OTHER PUBLICATIONS

Guan et al., "Semantic Role Labeling with Associated Memory Network," arXiv:1908.02367v1 [cs.CL], 2019, 11 pages.

Akbik et al., "K-SRL: Instance-based Learning for Semantic Role Labeling," 26th International Conference on Computational Linguistics: Technical Papers, 2016, 10 pages.

Sprechmann et al., "Memory-based Parameter Adaptation," arXiv:1802.10542v1 [stat.ML], 2018, 16 pages.

Rae et al., "Fast Parametric Learning with Activation Memorization," arXiv:1803.10049v1 [cs.LG], 2018, 16 pages.

Khandelwal et al., "Generalization through Memorization: Nearest Neighbor Language Models," arXiv:1911.00172v2 [cs.CL], 2020, 13 pages.

Mell et al., "The NIST Definition of Cloud Computing," Recommendations of the National Institute of Standards and Technology, NIST Special Publication 800-145, Sep. 2011, 7 pages.

Akbik et al., "K-SRL: Instance based learning for semantic role labeling", In Proceedings of COLING 2016, the 26th International Conference on Computational Linguistics: Technical Papers, 10 pages.

Cai et al.,"A full end-to-end semantic role labeler, syntactic agnostic over syntactic-aware", In Proceedings of the 27th International Conference on Computational Linguistics, pp. 2753-2765.

Carreras et al., "Introduction to the conll-2005 shared task: Semantic role labeling.", In Proceedings of the Ninth Conference on Computational Natural Language Learning, CONLL '05, Stroudsburg, PA, USA. Association for Computational Linguistics, pp. 152-164.

Devlin et al., "Bert: Pre-training of deep bidirectional transformers for language understanding", CoRR, abs/1810.04805, arXiv:1810.04805v2 [cs.CL] May 24, 2019, 16 pages.

Gildea et al., "Automatic labeling of semantic roles", Computational linguistics, vol. 28, No. 3, pp. 245-288.

Grave et al., "Unbounded cache model for online language modeling with open vocabulary", 31st Conference on Neural Information Processing Systems (NIPS 2017) Nov. 7, 2017, 11 pages.

Grave et al., "Improving neural language models with a continuous cache", CoRR, abs/1612.04426, Under review as a conference paper at ICLR 2017, Dec. 13, 2016, pp. 1-9.

Guan et al., "Semantic role labeling with associated memory network", In Proceedings of the 2019 Conference of the North American Chapter of the Association for Computational Linguistics: Human Language Technologies, vol. 1 (Long and Short Papers), Minneapolis, Minnesota. Association for Computational Linguistics, 11 pages.

Hajic et al., "The conll-2009 shared task: Syntactic and semantic dependencies in multiple languages", In Proceedings of the Thirteenth Conference on Computational Natural Language Learning: Shared Task, Association for Computational Linguistics, pp. 1-18.

He et al., "Jointly predicting predicates and arguments in neural semantic role labeling", In Proceedings of the 56th Annual Meeting of the Association for Computational Linguistics (vol. 2: Short Papers), Aug. 13, 2018, 7 pages.

He et al., "Deep semantic role labeling: What works and what's next", In Proceedings of the 55th Annual Meeting of the Association for Computational Linguistics (vol. 1: Long Papers), pp. 473-483.

Jurafsky et al., "Speech and language processing", an introduction to natural language processing an Introduction to Natural Language Processing, Computational Linguistics, and Speech Recognition 623 pages.

Kasai et al., "Syntax-aware neural semantic role labeling with supertags", In Proceedings of the 2019 Conference of the North American Chapter of the Association for Computational Linguistics: Human Language Technologies, vol. 1 (Long and Short Papers), Apr. 3, 2019, 9 pages.

Kingma et al., "Adam: A method for stochastic optimization", CoRR, abs/1412.6980, Published as a conference paper at ICLR 2015, pp. 1-15.

Li et al., "A unified syntax-aware framework for semantic role labeling", In Proceedings of the 2018 Conference on Empirical Methods in Natural Language Processing, Nov. 7, 2019, pp. 2401-2411.

Li et al., "Dependency and span, cross-style semantic role labeling on propbank and nombank", arXiv preprint arXiv:1911.02851, 11 pages.

Marcheggiani et al., "A simple and accurate syntax-agnostic neural model for dependency-based semantic role labeling", In Proceedings of the 21st Conference on Computational Natural Language Learning (CoNLL 2017), Jun. 15, 2017, 11 pages.

Marcheggiani et al., "Encoding sentences with graph convolutional networks for semantic role labeling", In Proceedings of the 2017 Conference on Empirical Methods in Natural Language Processing, Jul. 30, 2017, 11 pages.

Ouchi et al., "A span selection model for semantic role labeling", arXiv:1810.02245v1 [cs.CL] Oct. 4, 2018, 13 pages.

Peters et al., "Deep contextualized word representations", In NAACL-HLT, arXiv:1802.05365v2 [cs.CL] Mar. 22, 2018, 15 pages.

Pradhan et al., "Conll—2012 shared task: Modeling multilingual unrestricted coreference in ontonotes", In EMNLPCoNLL Shared Task, Proceedings of the Joint Conference on EMNLP and CoNLL: Shared Task, Jeju Island, Korea, Jul. 13, 2012. 2012 Association for Computational Linguistics, pp. 1-40.

Punyakanok et al., "The importance of syntactic parsing and inference in semantic role labeling", 2008 Association for Computational Linguistics vol. 34, No. 2, Jun. 19, 2007, 257-287.

Rae et al., "Fast parametric learning with activation memorization", In ICML, Proceedings of the 35 th International Conference on Machine Learning, Stockholm, Sweden, PMLR 80, 2018, 10 pages.

Roth et al., "Neural semantic role labeling with dependency path embeddings", In Proceedings of the 54th Annual Meeting of the Association for Computational Linguistics (vol. 1: Long Papers) Jul. 18, 2016, 11 pages.

Sprechmann et al., "Memory-based parameter adaptation", Published as a conference paper at ICLR 2018, CoRR, abs/1802.10542, Feb. 28, 2018, pp. 1-16.

Strubell et al., "Linguistically-informed self-attention for semantic role labeling", In Proceedings of the 2018 Conference on Empirical Methods in Natural Language Processing, Nov. 12, 2018, 14 pages.

Tan et al., "Deep semantic role labeling with self-attention", The Thirty-Second AAAI Conference on Artificial Intelligence (AAAI-18) in AAAI, pp. 4929-4936.

Marquez et al., "Semantic role labeling as sequential tagging", Proceedings of the 9th Conference on Computational Natural Language Learning (CoNLL), pp. 193-196.

He et al., "Syntax for semantic role labeling, to be, or not to be", Proceedings of the 56th Annual Meeting of the Association for Computational Linguistics (Long Papers), pp. 2061-2071.

Zhou et al., "End-to-end learning of semantic role labeling using recurrent neural Networks", Proceedings of the 53rd Annual Meeting of the Association for Computational Linguistics and the 7th International Joint Conference on Natural Language Processing, Beijing, China, Jul. 26-31, 2015a, pp. 1127-1137.

Zhou et al., "Parsing all: Syntax and semantics, dependencies and spans", arXiv preprint arXiv:1908.11522, arXiv:1908.11522v3 [cs.CL] Oct. 6, 2020, 12 pages.

* cited by examiner

PARAMETERIZED NEIGHBORHOOD MEMORY ADAPTATION

BACKGROUND

The subject disclosure relates to semantic role labeling, and more specifically to parameterized neighborhood memory adaptation for semantic role labeling.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate parameterized neighborhood memory adaptation for semantic role labeling are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a receiver component that can access a semantic role labeling model trained on a training dataset. In various aspects, the computer-executable components can further comprise an execution component that can retrain a labeler of the semantic role labeling model based on a set of neighborhood parameters learned from the training dataset. In some cases, the execution component can execute, after retraining, the semantic role labeling model on an inputted sentence.

According to one or more embodiments, the above-described system can be implemented as a computer-implemented method and/or computer program product.

DETAILED DESCRIPTION

Figure 1:
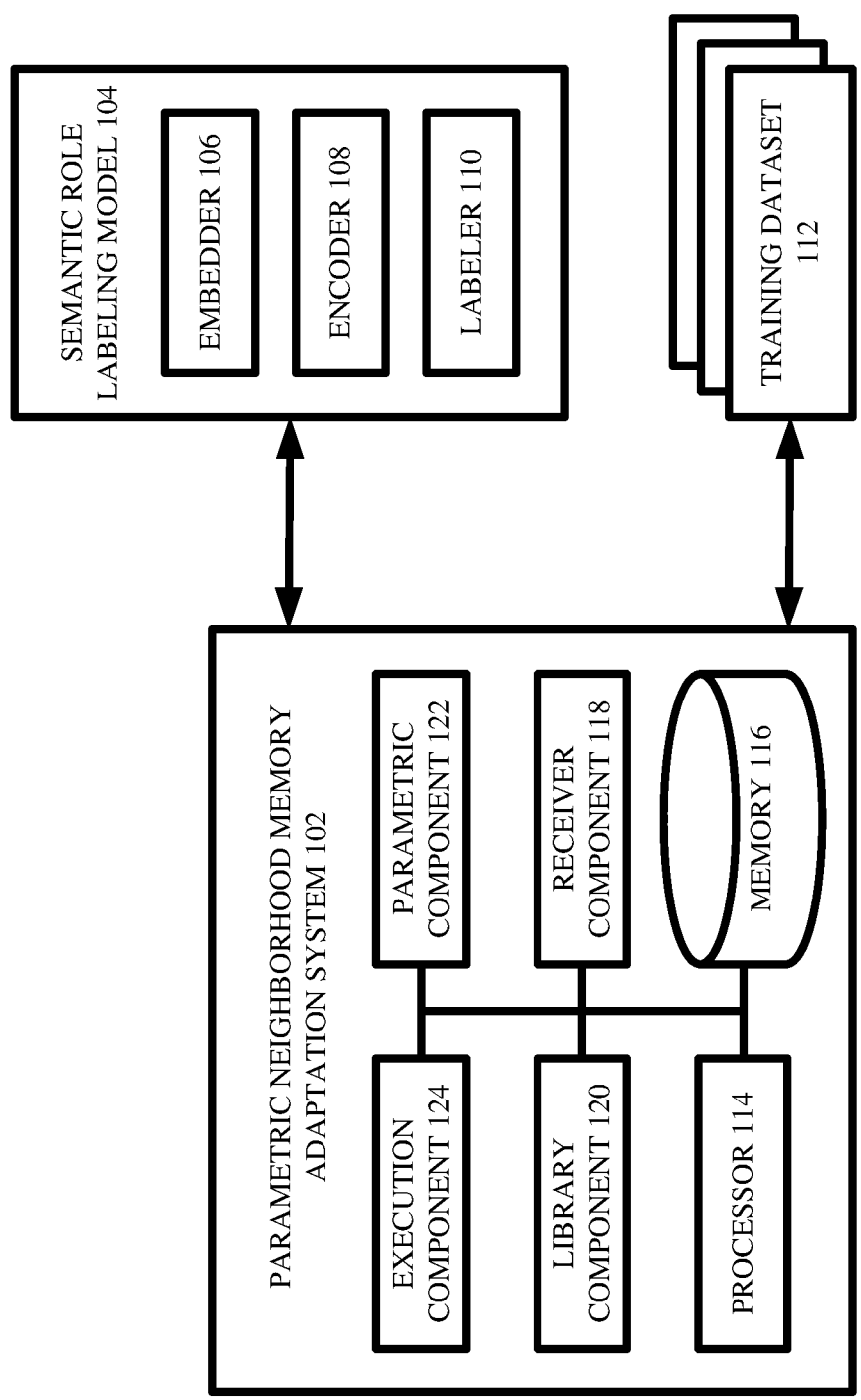
FIG. 1 illustrates a block diagram of an example, non-limiting system that facilitates parameterized neighborhood memory adaptation for semantic role labeling in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Semantic role labeling ("SRL") is the process of assigning labels to the tokens (e.g., words) of a sentence, where such labels identify the semantic roles played by the tokens. That is, SRL can be considered as the process of interpreting the words in a sentence so as to identify who did what to whom (e.g., identifying the predicate of a sentence, identifying the subject of a sentence, identifying an adjunct of a sentence, identifying an argument of the predicate, identifying a tense of the predicate). SRL is considered as a fundamental task of natural language processing. Various applications of SRL include automated question-answering, automated textual entailment, and/or automated machine translation.

SRL is typically decomposed into four sub-tasks: 1) predicate identification; 2) sense disambiguation; 3) argument identification for each predicate; and/or 4) role classification for each identified argument. In various aspects, it can be assumed that the predicate of a sentence is given and/or known, and so the argument prediction problem can be converted into a sequence tagging problem both for span and dependency type arguments.

SRL can be performed by a machine learning model. In various cases, deep learning models (e.g., neural networks) that are trained to perform SRL can achieve good results. However, such deep learning models often generate inaccurate predictions when low-frequency exceptions are encountered. In various aspects, the semantic role of a token (e.g., a word) can heavily depend upon the context of the token. A low-frequency exception can be a semantic role of a token that is heavily context-dependent and that occurs infrequently in a training dataset, meaning that a deep learning model can be impeded from learning that semantic role.

For example, consider a first sentence: "He fixed lunch for his family." In this first sentence, "fix" is the predicate, "he" is the subject, "lunch" is the object that is fixed, and "his family" is the benefactive. Now, consider a second sentence: "I can fix him some lunch." In this second sentence, "fix" is again the predicate, "I" is the subject, "lunch" is again the object that is fixed, and "him" is the benefactive. Note that, in the first sentence, the object that is fixed immediately follows the predicate, while, in the second sentence, the benefactive immediately follows the predicate. In various instances, it can be the case that a training dataset includes many sentences that are structured like the first sentence but includes very few sentences that are structured like the second sentence. That is, the training dataset can include many sentences in which the predicate is immediately followed by the object and can include few sentences in which the predicate is immediately followed by the benefactive. Accordingly, in the above example, when a deep learning model trained on such a training dataset encounters a sentence having a benefactive that immediately follows the predicate "fix," the deep learning model can be likely to inaccurately label the true benefactive as the object that is fixed. In other words, sentences that include the predicate in which the benefactive immediately follows the predicate can be considered as a low-frequency exception, and the deep learning model can fail to properly generalize this low-frequency exception. Systems and/or techniques which can address the problem of low-frequency exceptions can thus be desirable.

Various embodiments of the invention can address one or more of these technical problems. Specifically, various embodiments of the invention can provide systems and/or techniques that can facilitate parameterized neighborhood memory adaptation ("PNMA") for semantic role labeling. In various cases, PNMA can be considered as a machine learning technique developed by the inventors of various embodiments of the invention which can help to ameliorate the technical problem of low-frequency exceptions. In other words, when PNMA is implemented as described herein, a deep learning model that is trained on a training dataset to perform SRL can more accurately identify semantic roles of tokens, even if examples of such semantic roles are scarce in the training dataset (e.g., even if such semantic roles are low-frequency exceptions).

In particular, PNMA can, as a non-limiting example, include at least two phases: library generation, and neighborhood parameterization. In the library generation phase, after a deep learning model has been conventionally trained on a training dataset to perform SRL, a sentence from the training dataset can be fed to the deep learning model. Based on the sentence, one or more hidden layers of the deep learning model can generate activation maps for the tokens in the sentence. Specifically, the one or more hidden layers can output a separate activation map for each token in the sentence, where an activation map for a token can be a vector and/or matrix that represents the token in the sentence. In various instances, the activation map for each token in the sentence can be electronically recorded in a library (e.g., any suitable data structure). In various aspects, such recording of activation maps in the library can be repeated for every sentence in the training dataset (e.g., and/or for fewer than all sentences in the training dataset).

In the neighborhood parameterization phase, the library of activation maps can be leveraged to teach the deep learning model how to handle low-frequency exceptions. Specifically, a set of learnable neighborhood parameters (e.g., a set of scalars, vectors, and/or matrices) can be randomly initialized. In various instances, the deep learning model can again be fed a sentence from the training dataset, and the one or more hidden layers of the deep learning model can again generate an activation map for each token in the inputted sentence. For each of these token activation maps, a set of nearest neighbors in the library can be identified. In other words, the one or more hidden layers of the deep learning model can generate a vector/matrix representing a given token in the inputted sentence, and a set of vectors/matrices that are stored in the library and that are similar to the vector/matrix representing that given token can be identified (e.g., such as via Euclidean distance computations).

In various aspects, for each token activation map, the set of learnable neighborhood parameters and the set of nearest neighbors of that token activation map can be combined via any suitable mathematical functions, thereby yielding a resultant vector/matrix which can be referred to as a neighborhood parametric representation of that token activation map. For example, in some cases, the set of nearest neighbors can be summed and respectively weighted by the set of learnable neighborhood parameters. In other cases, any other suitable mathematical operators can be used to combine the set of nearest neighbors with the set of learnable neighborhood parameters, with the resulting vector/matrix being considered as the neighborhood parametric representation. In any case, a neighborhood parametric representation can be computed for each token activation map generated by the one or more hidden layers.

In various aspects, such neighborhood parametric representations can be fed to the remaining hidden layers of the deep learning model, and the deep learning model can thus output labels that predict the semantic roles of each token in the sentence. Because the sentence is from the training dataset, the semantic roles of the tokens in the sentence can be known (e.g., the accuracy of the labels outputted by the deep learning model can be measured). Accordingly, backpropagation can be performed so as to update the values of the learnable neighborhood parameters (e.g., and/or to update the weights and/or biases of the deep learning model). In various aspects, such updating of the values of the learnable neighborhood parameters can be performed for each sentence in the training dataset (e.g., and/or for fewer than all sentences in the training dataset). In some cases, batch updating can be performed.

After completion of both the library generation phase and the neighborhood parameterization phase, the deep learning model can be able to more accurately assign semantic roles to tokens, even for low-frequency exceptions. Such improved performance, which has been empirically shown by the inventors of various embodiments of the invention, can be due to the implementation of the library of activation maps and the learnable neighborhood parameters. Specifically, a token activation map can be considered as a vector/ matrix that is generated by the deep learning model to represent a given token in a given sentence. Because the semantic role of a token can depend upon context (e.g., can depend upon the other tokens in the sentence), the deep learning model can generate one activation map for a given token that appears in a given sentence, and can generate a different activation map for that same token appearing in a different sentence. The inventors of various embodiments of the invention recognized that the semantic role of a given token in a given sentence can be informed by other semantic roles of that same token in other sentences. In other words, the inventors of various embodiments of the invention recognized that the nearest neighbors of an activation map of a token can contain valuable information relating to the semantic role of that token. Accordingly, such nearest neighbors can be identified in the generated library, and such nearest neighbors can be combined via application of the learnable neighborhood parameters (e.g., the learnable neighborhood parameters can be weights that are used to compute a weighted sum of the nearest neighbors). The values of the learnable neighborhood parameters can be randomly initialized and can then be iteratively updated via backpropagation as described herein. Once fully updated, the learnable neighborhood parameters can be utilized by the deep learning model when deployed in the field. As the inventors of various embodiments of the invention have empirically confirmed through experimentation, implementing such learnable neighborhood parameters can result in the deep learning model having an improved accuracy rate when encountering low-frequency exceptions.

In various aspects, embodiments of the invention can be considered as a computerized tool (e.g., a combination of computer hardware and/or computer software) that can electronically improve the performance of a trained SRL model by implementing PNMA. Specifically, in various embodiments, such a computerized tool can comprise a receiver component, a library component, a parametric component, and an execution component.

In various instances, the trained SRL model can be a deep learning model (e.g., a neural network) that includes three portions: an embedder, an encoder, and a labeler. The embedder of the trained SRL model can include one or more layers that can generate word embeddings, where a word embedding can be a numerical vector (and/or matrix) which represents a word. As those having ordinary skill in the art will appreciate, the embedder can include any suitable number of layers and/or neurons implementing any suitable activation functions so as to receive as input a given sentence and to produce as output one numerical vector for each token (e.g., for each word) in the sentence.

In various cases, the encoder of the trained SRL model can include one or more layers that can sequentially process the word embeddings produced by the embedder. As those having ordinary skill in the art will appreciate, the encoder can include any suitable number of layers and/or neurons implementing any suitable activation functions so as to receive as input the word embeddings from the embedder and to produce as output activation maps that represent processed versions of the word embeddings. Specifically, the encoder can generate one activation map (e.g., one vector) for each word embedding generated by the embedder, and thus for each token in the given sentence. Accordingly, such activation maps can be referred to as token activation maps.

In various aspects, the labeler of the trained SRL model can include one or more layers that can predict the semantic roles of the tokens in the given sentence based on the activation maps generated by the encoder. As those having ordinary skill in the art will appreciate, the labeler can include any suitable number of layers and/or neurons implementing any suitable activation functions so as to receive as input the token activation maps from the encoder and to produce as output labels that identify the semantic roles of each token in the given sentence.

In various instances, the embedder, the encoder, and the labeler can be trained in an end-to-end fashion on a training dataset. That is, the semantic roles of each token in each sentence of the training dataset can be known, and so backpropagation can be implemented to iteratively update the weights and/or biases of the embedder, the encoder, and/or the labeler, thereby resulting in the trained SRL model.

In various embodiments, the receiver component can electronically receive and/or otherwise electronically access the trained SRL model and/or the training dataset. In various cases, the receiver component can electronically retrieve the trained SRL model and/or the training dataset from any suitable centralized and/or decentralized data structure (e.g., graph data structure, relational data structure, hybrid data structure), whether remote from and/or local to the receiver component 118. Accordingly, other components of the computerized tool described herein can electronically interact with and/or otherwise have electronic access to the trained SRL model and/or to the training dataset.

In various embodiments, the library component can electronically generate a library of token activation maps based on the training dataset. Specifically, the library component can electronically feed a sentence from the training dataset to the embedder of the trained SRL model. As mentioned above, the embedder of the trained SRL model can create word embeddings representing the tokens in the sentence, and the encoder of the trained SRL model can create token activation maps based on the word embeddings. Specifically, the encoder can generate a separate token activation map for each word embedding generated by the embedder, and thus for each token in the sentence. In various instances, the library component can electronically capture, store, log, and/or otherwise record such token activation maps generated by the encoder. In various aspects, the library component can repeat such capturing, storing, logging, and/or otherwise recording for all (and/or fewer than all) sentences in the training dataset. The resulting collection of electronically stored token activation maps can be considered as a library of token activation maps.

In various embodiments, the parametric component can electronically create a set of k neighborhood parameters, for any suitable positive integer k. In some cases, each of the k neighborhood parameters can be a randomly initialized scalar. In other cases, each of the k neighborhood parameters can be a randomly initialized vector and/or matrix that has the same dimensionality as a token activation map generated by the encoder of the trained SRL model. For example, if the encoder outputs one or more a-element vectors (e.g., an a-element vector can be a vector having a numerical elements) representing one or more tokens in a sentence, then each of the k neighborhood parameters can be a randomly-initialized a-element vector, for any suitable positive integer a. As another example, if the encoder outputs one or more b-by-c matrices (e.g., a b-by-c matrix can be a matrix having b rows and c columns) representing one or more tokens in a sentence, then each of the k neighborhood parameters can be a b-by-c matrix, for any suitable positive integers b and c.

In various embodiments, the execution component can electronically retrain the labeler of the trained SRL model based on the k neighborhood parameters. Specifically, the execution component can electronically feed a given sentence from the training dataset to the embedder of the trained SRL model, the embedder can generate a word embedding for each token in the given sentence, and the encoder of the trained SRL model can generate a token activation map for each word embedding (e.g., for each token in the given sentence).

In various aspects, for each token activation map generated by the encoder based on the given sentence, the parametric component can identify k nearest neighbors of that token activation map in the library of token activation maps. That is, for a particular token activation map generated by the encoder, the parametric component can compute a Euclidean distance between that particular token activation map and every other token activation map that is stored in the library. The parametric component can thus rank the token activation maps that are stored in the library in order of ascending and/or descending Euclidean distance, and the k token activation maps in the library that correspond to the k smallest Euclidean distances can be selected as the k nearest neighbors. In various cases, the parametric component can repeat this Euclidean distance computation for each token activation map generated by the encoder based on the given sentence.

In various instances, for each token activation map generated by the encoder based on the given sentence, the parametric component can mathematically combine the k nearest neighbors of that token activation map with the k neighborhood parameters in order to yield a neighborhood parametric representation of that token activation map. As an example, the k neighborhood parameters can be respectively multiplied (e.g., via scalar multiplication, matrix multiplication, and/or inner product computation, as applicable and/or desired) by the k nearest neighbors of a given token activation map, and the resulting products can be summed, thereby yielding the neighborhood parametric representation of that given token activation map. In various cases, the parametric component can generate a neighborhood parametric representation for each token activation map generated by the encoder based on the given sentence.

In various aspects, the execution component can electronically feed to the labeler of the trained SRL model the neighborhood parametric representations generated by the parametric component in place of and/or in addition to the token activation maps generated by the encoder of the trained SRL model. In various cases, the labeler can thus output labels that predict the semantic roles played by each of the tokens in the given sentence. In various instances, because the given sentence is a member of the training dataset, the ground truth semantic roles of the tokens in the given sentence can be known. Accordingly, the execution component can electronically compute a loss (e.g., difference) between the labels outputted by the labeler and the known ground truths, and the execution component can electronically update via backpropagation the k neighborhood parameters and/or the weights/biases of the labeler. In some cases, the weights/biases of the embedder and/or of the encoder can be frozen and/or unchanged.

In various instances, the execution component and/or parametric component can repeat the above-described process for every sentence in the training dataset (e.g., and/or for fewer than all sentences in the training dataset). In some cases, the execution component and/or the parametric component can facilitate batch updating and/or batch training (e.g., updating the k neighborhood parameters and/or the weights/biases of the labeler after multiple sentences have been fed to the trained SRL model). In any case, the result can be that the values of the k neighborhood parameters are fully updated and/or learned, and/or that the weights/biases of the labeler are fully re-updated and/or re-learned.

In various embodiments, the now-retrained SRL model can exhibit improved performance accuracy even when encountering low-frequency exceptions. In various aspects, the execution component can electronically execute and/or can otherwise electronically facilitate the execution of the now-retrained SRL model on an inputted sentence. That is, the execution component can electronically feed the inputted sentence to the embedder of the now-retrained SRL model, the embedder can generate a word embedding for each token in the inputted sentence, and the encoder of the now-retrained SRL model can generate a token activation map for each word embedding (e.g., for each token in the inputted sentence). In various instances, for each token activation map generated by the encoder based on the inputted sentence, the parametric component can identify the k nearest neighbors of that token activation map in the library, and the parametric component can mathematically combine the k nearest neighbors with the k neighborhood parameters that were fully learned/updated as described above, thereby yielding a neighborhood parametric representation of each token activation map generated by the encoder. In various aspects, the execution component can then feed the neighborhood parametric representations generated by the parametric component to the labeler of the now-retrained SRL model, and the labeler can generate labels that indicate the semantic roles of the tokens in the inputted sentence.

To help clarify various portions of the above discussion, consider the following non-limiting example. Suppose that an SRL model having an embedder, an encoder, and a labeler has been trained on a training dataset containing 2000 sentences (e.g., sentence 1 to sentence 2000).

In various cases, the library component can generate the library of token activation maps as follows. The library component can feed sentence 1 from the training dataset to the embedder, which can ultimately cause the encoder to output a token activation map for each token in sentence 1. For instance, if sentence 1 is "The dog runs quickly.", the encoder can generate a token activation map for "the," a token activation map for "dog," a token activation map for "runs," and a token activation map for "quickly." The library component can electronically record these four activation maps. Next, the library component can feed sentence 2 from the training dataset to the embedder, which can ultimately cause the encoder to output a token activation map for each token in sentence 2 (e.g., if sentence 2 has 7 tokens, then the encoder can generate 7 token activation maps, one per token). The library component can likewise record the token activation maps generated by the encoder based on sentence 2. The library component can repeat this process for the other 1998 sentences in the training dataset, with the result being a library of stored token activation maps.

In various cases, the parametric component can, in this non-limiting example, randomly initialize a set of 10 neighborhood parameters. It is to be understood that the number 10 as used in this illustration is a mere non-limiting example. In various instances, any other suitable positive integer can be used. As mentioned above, the neighborhood parameters can be scalars, vectors, and/or matrices, as desired. In some cases, if the neighborhood parameters are vectors and/or matrices, they can have the same dimensionality as the token activation maps generated by the encoder.

In various instances, the execution component can again feed sentence 1 to the embedder, which again can cause the encoder to generate a token activation map for each token in sentence 1: a token activation map for "the," a token activation map for "dog," a token activation map for "runs," and a token activation map for "quickly." For each given token activation map generated by the encoder based on sentence 1, the parametric component can identify 10 token activation maps from the library that are most similar to the given token activation map. That is, in this non-limiting example, the number of nearest neighbors that are identified for each token activation map generated by the encoder can be equal to the number of neighborhood parameters that have been randomly initialized by the parametric component.

For example, in some cases, the parametric component can compute a Euclidean distance between the token activation map for "the" generated by the encoder and every other token activation map that is stored in the library. In this non-limiting example, the parametric component can thus select the 10 token activation maps from the library that correspond to the 10 smallest computed Euclidean distances, with these 10 selected token activation maps being considered as the 10 nearest neighbors of the token activation map for "the." The parametric component can repeat this for the other tokens in sentence 1 (e.g., can identify 10 nearest neighbors of the token activation map for "dog," can identify 10 nearest neighbors of the token activation map for "runs," and can identify 10 nearest neighbors of the token activation map for "quickly").

As another example, in some cases, the library can be collated by token. That is, the library can include a plurality of different token activation maps that are based on "the" since "the" can be used in a plurality of different sentences in the training dataset, can include a plurality of different token activation maps that are based on "dog" since "dog" can be used in a plurality of different sentences in the training dataset, can include a plurality of different token activation maps that are based on "runs" since "runs" can be used in a plurality of different sentences in the training dataset, and can include a plurality of different token activation maps that are based on "quickly" since "quickly" can be used in a plurality of different sentences in the training dataset. Accordingly, the parametric component can compute a Euclidean distance between the token activation map for "the" generated by the encoder and every token activation map stored in the library that is also based on the token "the." Just as above, the parametric component can thus select, for example, the 10 nearest neighbors of the token activation map for "the" generated by the encoder based on these computed Euclidean distances. The parametric component can repeat this for the other tokens in sentence 1 (e.g., can identify 10 nearest neighbors of the token activation map for "dog" based on other token activation maps for "dog" that are stored in the library, can identify 10 nearest neighbors of the token activation map for "runs" based on other token activation maps for "runs" that are stored in the library, and can identify 10 nearest neighbors of the token activation map for "quickly" based on other token activation maps for "quickly" that are stored in the library).

In various instances, for each token activation map generated by the encoder based on sentence 1, the parametric component can generate a neighborhood parametric representation by applying, in this non-limiting example, the 10 neighborhood parameters to the 10 nearest neighbors of that token activation map. For example, the 10 neighborhood parameters can be scalars, which the parametric component can use to compute a weighted sum of the 10 nearest neighbors. In such case, the parametric component can respectively multiply the 10 neighborhood parameters by the 10 nearest neighbors of the token activation map for "the," and such products can be added together, with the resulting weighted sum being considered as the neighborhood parametric representation of "the." Similarly, the parametric component can compute neighborhood parametric representations for "dog," "runs," and "quickly."

As another example, the 10 neighborhood parameters can be vectors and/or matrices, and any suitable mathematical operators (e.g., inner products, matrix multiplications) can be applied to convert such vectors/matrices into scalars, which scalars can be used to compute a weighted sum of the 10 nearest neighbors of a given token activation map. In any case, the parametric component can compute a neighborhood parametric representation for each token in sentence 1.

In various aspects, the execution component can feed the neighborhood parametric representations generated by the parametric component to the labeler of the SRL model, which can cause the labeler to output labels indicating the semantic roles of the tokens in sentence 1 (e.g., the semantic role of "the," the semantic role of "dog," the semantic role of "runs," and the semantic role of "quickly"). In various instances, the execution component can compute a loss and/or error based on these outputted labels, and such loss and/or error can be used to update the values of the 10 neighborhood parameters (e.g., via backpropagation). In some cases, such loss and/or error can also be used to update the weights and/or biases of the labeler (e.g., via backpropagation).

In various aspects, the execution component can sequentially feed the remaining 1999 sentences in the training dataset to the embedder of the SRL model, thereby facilitating iterative updating of the 10 neighborhood parameters. In various aspects, as mentioned above, batch training/updating can be implemented if desired. In any case, the ultimate result can be that the 10 neighborhood parameters become fully learned and/or updated. At such point, the SRL model can be deployed with, for example, the 10 fully learned/updated neighborhood parameters, which can allow the SRL model to more accurately handle low-frequency exceptions in the field.

Various embodiments of the invention can be employed to use hardware and/or software to solve problems that are highly technical in nature (e.g., to facilitate parameterized neighborhood memory adaptation for semantic role labeling), that are not abstract and that cannot be performed as a set of mental acts by a human. Further, some of the processes performed can be performed by a specialized computer (e.g., neural network trained to perform semantic role labeling). In various aspects, some defined tasks associated with various embodiments of the invention can include: accessing, by a device operatively coupled to a processor, a semantic role labeling model trained on a training dataset; retraining, by the device, a labeler of the semantic role labeling model based on a set of neighborhood parameters learned from the training dataset, where the neighborhood parameters are iteratively updated during the retraining; and executing, by the device and after the retraining, the semantic role labeling model on an inputted sentence. In various instances, some other defined tasks associated with various embodiments of the invention can include: storing, by the device, a library of token activation maps that are generated by an encoder of the semantic role labeling model based on the training dataset; identifying, by the device and in the library, one or more first nearest neighbors of a first token activation map generated by the encoder based on a first token in the training dataset; and computing, by the device, a first neighborhood parametric representation by applying the set of neighborhood parameters to the one or more first nearest neighbors. Such defined tasks are not typically performed manually by humans.

Moreover, neither the human mind nor a human with pen and paper can electronically access a trained SRL model, electronically retrain a labeler of the trained SRL model based on learnable neighborhood parameters, electronically store a library of token activation maps generated by an encoder of the trained SRL model, electronically identify in the library nearest neighbors of a given token activation map, electronically apply the neighborhood parameters to the identified nearest neighborhoods, and/or electronically execute the trained SRL model after the retraining. Instead, various embodiments of the invention are inherently and inextricably tied to computer technology and cannot be implemented outside of a computing environment (e.g., semantic role labeling models are inherently computerized objects that cannot exist outside of computing systems; likewise, a computerized tool that electronically retrains a semantic role labeling model to better handle low-frequency exceptions is also an inherently computerized device that cannot be practicably implemented in any sensible way without computers).

In various instances, embodiments of the invention can integrate into a practical application the disclosed teachings regarding parameterized neighborhood memory adaptation for semantic role labeling. Indeed, as described herein, various embodiments of the invention, which can take the form of systems and/or computer-implemented methods, can be considered as a computerized tool that can electronically retrain and/or reconfigure an already-trained SRL model to more accurately identify semantic roles of low-frequency exceptions (e.g., to more accurately detect/learn semantic roles that are scarce in the training dataset). As explained above, when a particular semantic role of a token does not occur frequently in a training dataset (e.g., such a semantic role might be heavily contextual), an SRL model conventionally trained on the training dataset can fail to learn how to recognize that semantic role when deployed in the field. Conventionally, this technical problem is addressed only by implementing a larger training dataset (e.g., by including more examples of such a semantic role in the training dataset), which can be time-consuming and/or resource-intensive. In stark contrast, the inventors of various embodiments of the invention recognized that such low-frequency exceptions can be combated without changing the training dataset. Specifically, the SRL model can be retrained and/or reconfigured to more robustly handle low-frequency exceptions by leveraging a library of hidden activations of the SRL model and by leveraging a set of learnable neighborhood parameters. As described herein, such learnable neighborhood parameters can be randomly initialized, can be applied to combine a set of nearest neighbors of a given token activation map that are stored in the library, and can be iteratively updated through back-propagation. Once the learnable neighborhood parameters are fully learned/updated, the SRL model can be deployed with the library and the learnable neighborhood parameters, which can enable the SRL model to exhibit improved performance metrics (e.g., improved accuracy) with respect to low-frequency exceptions. Systems and/or techniques that can improve the very performance of computing devices such as SRL models clearly constitute a concrete and tangible technical improvement in the field of semantic role labeling.

Furthermore, various embodiments of the invention can control tangible, hardware-based, and/or software-based devices based on the disclosed teachings. For example, embodiments of the invention can actually execute, on tangible computer hardware, an SRL model that has been retrained and/or reconfigured with neighborhood parameters as described herein.

It should be appreciated that the figures and the herein disclosure describe non-limiting examples of various embodiments of the invention.

FIG. 1 illustrates a block diagram of an example, non-limiting system 100 that can facilitate parameterized neighborhood memory adaptation for semantic role labeling in accordance with one or more embodiments described herein. As shown, a parametric neighborhood memory adaptation system 102 (hereafter referred to as PNMA system 102 for brevity) can be electronically integrated, via any suitable wired and/or wireless electronic connections, with a semantic role labeling model 104 (hereafter referred to as SRL model 104 for brevity) and/or a training dataset 112.

In various instances, the SRL model 104 can be any suitable deep learning model (e.g., artificial neural network) that is trained (e.g., via supervised training, unsupervised training, reinforcement learning) on the training dataset 112. In various aspects, the SRL model 104 can comprise an embedder 106, an encoder 108, and/or a labeler 110.

In various cases, the embedder 106 can be one or more neural network layers that are configured to receive as input a sentence having any suitable number of tokens (e.g., any suitable number of words) and to produce as output a word embedding for each token in the sentence. As mentioned above, a word embedding can be any suitable numerical representation (e.g., a vector, a matrix, a tensor) of a token. As those having ordinary skill in the art will appreciate, the embedder 106 can comprise any suitable number of layers, any suitable number of neurons, any suitable types of activation functions, and/or any suitable inter-neuron connectivity architecture (e.g., fully connected, recurrent connections, skipped connections) so as to implement any suitable word embedding techniques. In some cases, the embedder 106 can implement any suitable non-contextualized embedding techniques, in which the word embedding of any given token is independent of the context of that token (e.g., independent of the other tokens that are around the given token in the sentence). In other cases, the embedder 106 can implement any suitable contextualized embedding techniques, in which the word embedding of any given token is dependent on the context of that token (e.g., such as Embeddings from Language Models (ELMo) and/or Bidirectional Encoder Representations from Transformers (BERT)).

In various aspects, the encoder 108 can be one or more neural network layers that are configured to receive as input the word embeddings generated by the embedder 106 and to produce as output a token activation map for each word embedding and thus for each token in the sentence. As mentioned above, a token activation map can be a numerical representation (e.g., a vector, a matrix, a tensor) of a token that is generated based on the word embedding of the token. As those having ordinary skill in the art will appreciate, the encoder 108 can comprise any suitable number of layers, any suitable number of neurons, any suitable types of activation functions, and/or any suitable inter-neuron connectivity architecture (e.g., fully connected, recurrent connections, skipped connections) so as to process word embeddings in any suitable fashion. For example, in some cases, the encoder 108 can comprise any suitable number of Long Short-Term Memory (LSTM) layers that are connected in any suitable arrangement (e.g., alternating forward LSTM layers and/or backward LSTM layers separated by Rectified Linear Unit (ReLU) layers).

In various instances, the labeler 110 can be one or more neural network layers that are configured to receive as input the token activation maps generated by the encoder 108 and to produce as output labels that indicate the predicted semantic roles of the tokens in the sentence. As those having ordinary skill in the art will appreciate, the labeler 110 can comprise any suitable number of layers, any suitable number of neurons, any suitable types of activation functions, and/or any suitable inter-neuron connectivity architecture (e.g., fully connected, recurrent connections, skipped connections) so as to assign semantic roles based on token activation maps. For example, in various aspects, the labeler 110 can comprise any suitable number of Conditional Random Field (CRF) layers.

Although the SRL model 104 is described herein as a deep learning model (e.g., a neural network), this is a non-limiting example. Those having ordinary skill in the art will appreciate that, in various embodiments, the SRL model 104 can have any other suitable machine learning architecture (e.g., support vector machine, regression model).

In various instances, the training dataset 112 can comprise any suitable number of sentences (e.g., natural language text), where each sentence includes any suitable number of tokens (e.g., words). In other words, different sentences in the training dataset 112 can comprise different numbers of tokens. In various cases, the semantic roles of the tokens of the sentences in the training dataset 112 can be known. Accordingly, in various aspects, the SRL model 104 can be trained end-to-end on the training dataset 112 (e.g., the weights and/or biases of the embedder 106, the encoder 108, and/or the labeler 110 can be iteratively updated via backpropagation).

In various cases, the training dataset 112 can contain low-frequency exceptions. When the SRL model 104 is conventionally trained on the training dataset 112, the SRL model 104 can fail to properly generalize and/or learn such low frequency exceptions. In various aspects, however, the PNMA system 102 can electronically retrain and/or reconfigure the SRL model 104 so that it exhibits improved accuracy when encountering low frequency exceptions, as described herein.

In various embodiments, the PNMA system 102 can comprise a processor 114 (e.g., computer processing unit, microprocessor) and a computer-readable memory 116 that is operably connected to the processor 114. The memory 116 can store computer-executable instructions which, upon execution by the processor 114, can cause the processor 114 and/or other components of the PNMA system 102 (e.g., receiver component 118, library component 120, parametric component 122, execution component 124) to perform one or more acts. In various embodiments, the memory 116 can store computer-executable components (e.g., receiver component 118, library component 120, parametric component 122, execution component 124), and the processor 114 can execute the computer-executable components.

In various embodiments, the PNMA system 102 can comprise a receiver component 118. In various aspects, the receiver component 118 can electronically retrieve and/or otherwise electronically access the SRL model 104 and/or the training dataset 112 from any suitable centralized and/or decentralized data structure (not shown), whether remote from and/or local to the receiver component 118. Accordingly, in various aspects, other components of the PNMA system 102 can manipulate and/or otherwise interact with the SRL model 104 and/or the training dataset 112.

In various embodiments, the PNMA system 102 can comprise a library component 120. In various aspects, the library component 120 can electronically generate a library of token activation maps based on the training dataset 112. More specifically, in various cases, the library component 120 can electronically feed a sentence from the training dataset 112 to the embedder 106 of the SRL model 104, which can cause the embedder 106 to output a word embedding for each token in the sentence. In various instances, for each word embedding produced by the embedder 106, the encoder 108 can generate a token activation map (e.g., one token activation map per token in the sentence). In various aspects, the library component 120 can electronically store the token activation maps generated by the encoder 108. In various cases, the library component 120 can repeat this storing process for each sentence in the training dataset 112 (and/or for fewer than all sentences in the training dataset 112). The result can be a collection of electronically recorded token activation maps, which collection can be referred to as the library of token activation maps.

In various embodiments, the PNMA system 102 can comprise a parametric component 122. In various aspects, the parametric component 122 can electronically create a set of neighborhood parameters. In various instances, a neighborhood parameter can be a scalar, vector, matrix, and/or tensor that is randomly initialized (e.g., that has random initial numerical values selected from any suitable numerical ranges) and that can be iteratively updated as described herein. In various cases, once the neighborhood parameters are fully updated and/or learned, the SRL model 104 can be able to more accurately label low-frequency exceptions.

In various embodiments, the PNMA system 102 can comprise an execution component 124. In various aspects, the execution component 124 can electronically facilitate updating of the neighborhood parameters created by the parametric component 122 as well as retraining of the labeler 110 based on the neighborhood parameters. Specifically, in various cases, the execution component 124 can electronically feed a sentence from the training dataset 112 to the embedder 106, which can cause the embedder 106 to generate a word embedding for each token of the sentence. Such word embeddings can be received by the encoder 108, which can cause the encoder 108 to generate a token activation map for each token of the sentence. In various cases, for each token activation map generated by the encoder 108 based on the sentence, the parametric component 122 can identify in the library generated by the library component 120 a set of nearest neighbors of the token activation map. That is, the parametric component 122 can identify which activation maps stored in the library are most similar to the token activation maps generated by the encoder 108 based on the sentence from the training dataset 112. In some cases, the parametric component 122 can identify these nearest neighbors through Euclidean distance computations. However, this is a non-limiting example. In other cases, the parametric component 122 can identify the nearest neighbors via any other suitable technique, such as via cosine similarity computations. In any case, the parametric component can identify in the library the nearest neighbors of each token activation map generated by the encoder 108 based on the sentence from the training dataset 112.

In various embodiments, for each token activation map generated by the encoder 108 based on the sentence from the training dataset 112, the parametric component 122 can compute a neighborhood parametric representation. In various cases, the neighborhood parametric representation of a given token can be equal to any suitable mathematical combination of the randomly initialized neighborhood parameters with the nearest neighbors of the token activation map of that token. For instance, if the neighborhood parameters are scalars, the neighborhood parametric representation of a given token can be equal to the sum of the nearest neighbors of the token activation map of the token respectively weighted by the neighborhood parameters. As another example, if the neighborhood parameters are vectors, matrices, and/or tensors, any suitable mathematical operators (e.g., inner products, norm computations) can be applied to the neighborhood parameters so as to yield a set of scalars, which scalars can then be used to compute a weighted sum of the nearest neighbors of the token activation map of a given token. In any case, the parametric component 122 can electronically compute a neighborhood parametric representation for each token activation map provided by the encoder 108 based on the sentence from the training dataset 112. In various cases, the dimensionality of a neighborhood parametric representation can be the same as the dimensionality of a token activation map generated by the encoder 108.

In various aspects, the execution component 124 can electronically feed the neighborhood parametric representations generated by the parametric component 122 to the labeler 110, which can cause the labeler 110 to output labels identifying the semantic roles of the tokens in the sentence from the training dataset 112. Because the sentence is from the training dataset 112, an error and/or loss associated with the outputted labels can be computed and can be utilized to update, via backpropagation, the values of the neighborhood parameters, as well as to update the weights/biases of the labeler 110. In various aspects, the neighborhood parameters and/or the weights/biases of the labeler 110 can be iteratively updated in this way for each sentence in the training dataset 112 (e.g., and/or for fewer than all sentences in the training dataset 112). In various instances, batch updating of the neighborhood parameters and/or the weights/biases of the labeler 110 can be facilitated (e.g., backpropagation can be iteratively applied based on batches of sentences from the training dataset 112, rather than based on each sentence individually from the training dataset 112). In any case, the result can be that the neighborhood parameters become fully updated and/or learned.

Once the neighborhood parameters become fully updated and/or learned, the execution component 124 can cause the SRL model 104 to be deployed in the field with the library of token activation maps and the fully updated/learned neighborhood parameters. In various cases, when the SRL model 104 executes in the field with the library of token activation maps and the fully updated/learned neighborhood parameters, the SRL model 104 can exhibit improved performance metrics (e.g., can more accurately identify the semantic roles of low-frequency exceptions).

Figure 2:
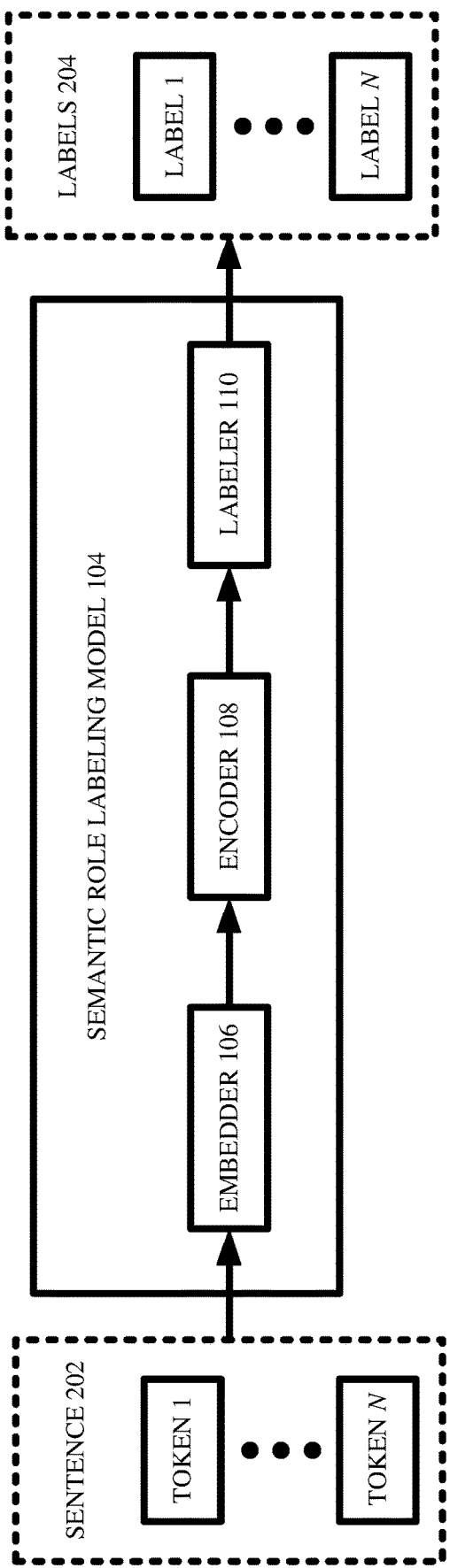
FIG. 2 illustrates a block diagram of an example, non-limiting semantic role labeling model in accordance with one or more embodiments described herein.

FIG. 2 illustrates a block diagram of an example, non-limiting semantic role labeling model in accordance with one or more embodiments described herein. In other words, FIG. 2 depicts how the SRL model 104 can function.

In various cases, the embedder 106 can receive as input a sentence 202. In various aspects, the sentence 202 can include n tokens (e.g., token 1 to token n) for any suitable positive integer n. That is, the sentence 202 can include n words. In various instances, the embedder 106 can generate n word embeddings (not shown) that respectively correspond to the n tokens of the sentence 202 (e.g., can generate a word embedding 1 for the token 1, can generate a word embedding n for the token n). In various aspects, the encoder 108 can receive as input these n word embeddings and can produce as output n token activation maps (not shown) that respectively correspond to the word embeddings and/or tokens (e.g., can generate a token activation map 1 for the word embedding 1 and/or the token 1, can generate a token activation map n for the word embedding n and/or the token n). In various instances, the labeler 110 can receive as input these n token activation maps and can produce as output labels 204. In various aspects, as shown, the labels 204 can include n labels (e.g., label 1 to label n), which can respectively identify and/or otherwise indicate the inferred and/or predicted semantic roles of the n tokens of the sentence 202 (e.g., the label 1 can indicate the inferred semantic role of the token 1, the label n can indicate the inferred semantic role of the token n). As explained below, the herein disclosure describes how the SRL model 104 can be retrained and/or reconfigured by the PNMA system 102 so as to exhibit improved performance when encountering low-frequency exceptions.

Figure 3:
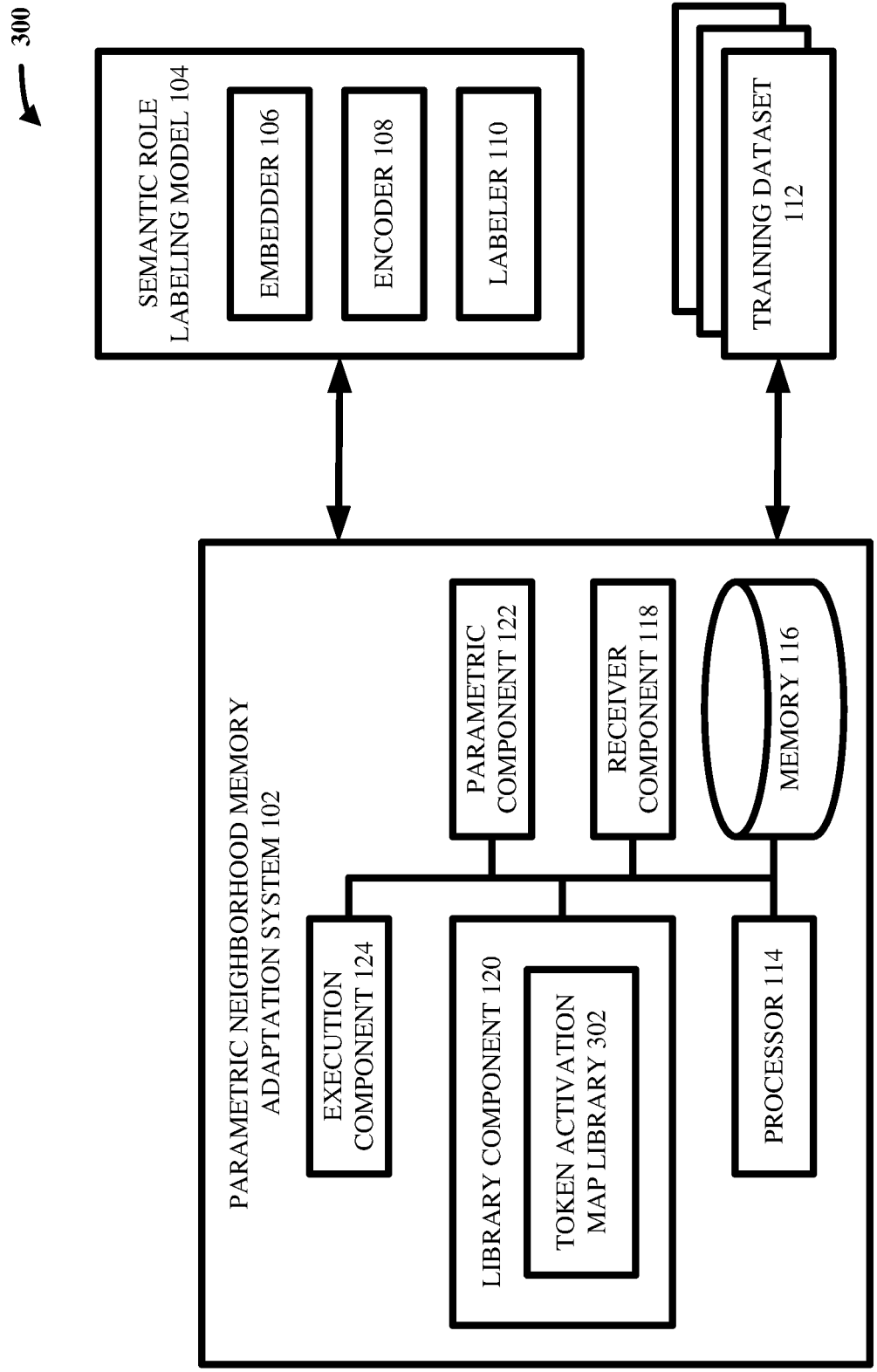
FIG. 3 illustrates a block diagram of an example, non-limiting system including a token activation map library that facilitates parameterized neighborhood memory adaptation for semantic role labeling in accordance with one or more embodiments described herein.

FIG. 3 illustrates a block diagram of an example, non-limiting system 300 including a token activation map library that can facilitate parameterized neighborhood memory adaptation for semantic role labeling in accordance with one or more embodiments described herein. As shown, the system 300 can, in some cases, comprise the same components as the system 100, and can further comprise a token activation map library 302.

In various embodiments, the library component 120 can electronically generate and/or otherwise electronically maintain the token activation map library 302 by leveraging the training dataset 112. That is, the library component 120 can create an empty data structure as the token activation map library 302, and the library component 120 can iteratively fill up the empty data structure with token activation maps that are generated by the encoder 108 of the SRL model 104 based on sentences from the training dataset 112. This is explained in more detail with respect to FIG. 4.

Figure 4:
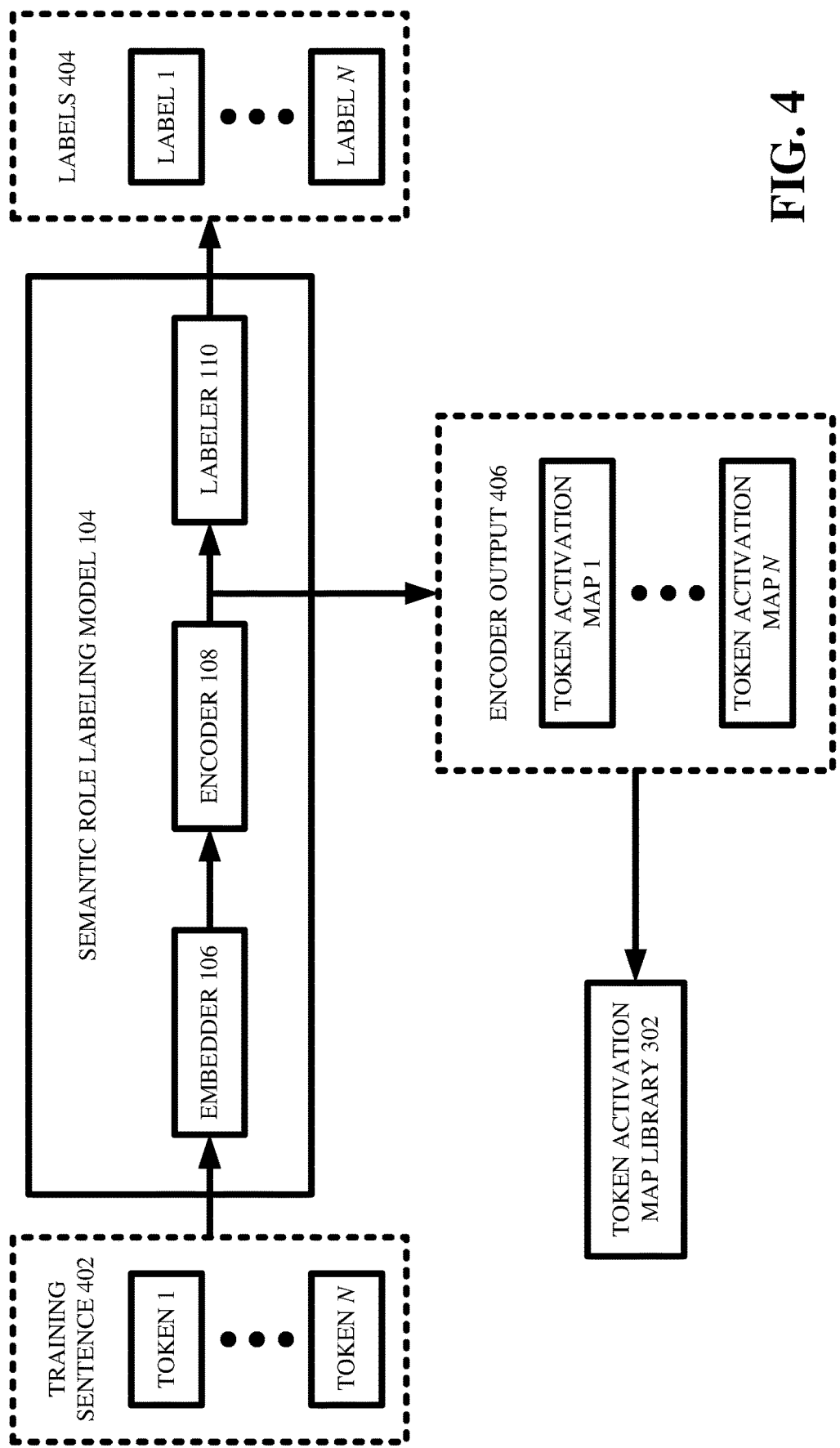
FIG. 4 illustrates an example, non-limiting block diagram showing how a token activation map library can be generated to facilitate parameterized neighborhood memory adaptation for semantic role labeling in accordance with one or more embodiments described herein.

FIG. 4 illustrates an example, non-limiting block diagram 400 showing how a token activation map library can be generated to facilitate parameterized neighborhood memory adaptation for semantic role labeling in accordance with one or more embodiments described herein.

As shown, the library component 120 can, in various embodiments, feed a training sentence 402 from the training dataset 112 as input to the embedder 106 of the SRL model 104. In various instances, the training sentence 402 can comprise n tokens, for any suitable positive integer n. Note that, although the herein figures depict sentences as each having n tokens, this is a non-limiting example shown for ease of illustration. Those having ordinary skill in the art will appreciate that different sentences can have different numbers and/or types of tokens (e.g., different sentences can have different numbers, permutations, and/or combinations of words). In various aspects, the embedder 106 can generate output that is fed as input to the encoder 108. As mentioned above, the output of the embedder 106 can be n word embeddings that respectively correspond to the n tokens of the training sentence 402. In various instances, the encoder 108 can generate encoder output 406 that is fed as input to the labeler 110, where the labeler 110 can output labels 404. As shown, the labels 404 can include n labels (e.g., label 1 to label n) that respectively predict and/or infer the semantic roles of the n tokens of the training sentence 402 (e.g., the label 1 can identify the predicted semantic role of the token 1, the label n can identify the predicted semantic role of the token n). As shown, in various cases, the encoder output 406 can comprise n token activation maps that respectively correspond to the n word embeddings generated by the embedder 106 and thus to the n tokens of the training sentence 402 (e.g., a token activation map 1 for the token 1, a token activation map n for the token n). In various cases, the library component 120 can electronically capture, store, log, and/or record the encoder output 406 in the token activation map library 302. In other words, the library component 120 can feed a sentence (e.g., 402) from the training dataset 112 to the SRL model 104, and the library component 120 can store the output (e.g., 406) of the encoder 108 of the SRL model 104 in the token activation map library 302. In various cases, the library component 120 can repeat this process for all (and/or for fewer than all) sentences in the training dataset 112, thereby iteratively populating the token activation map library 302.

Figure 5:
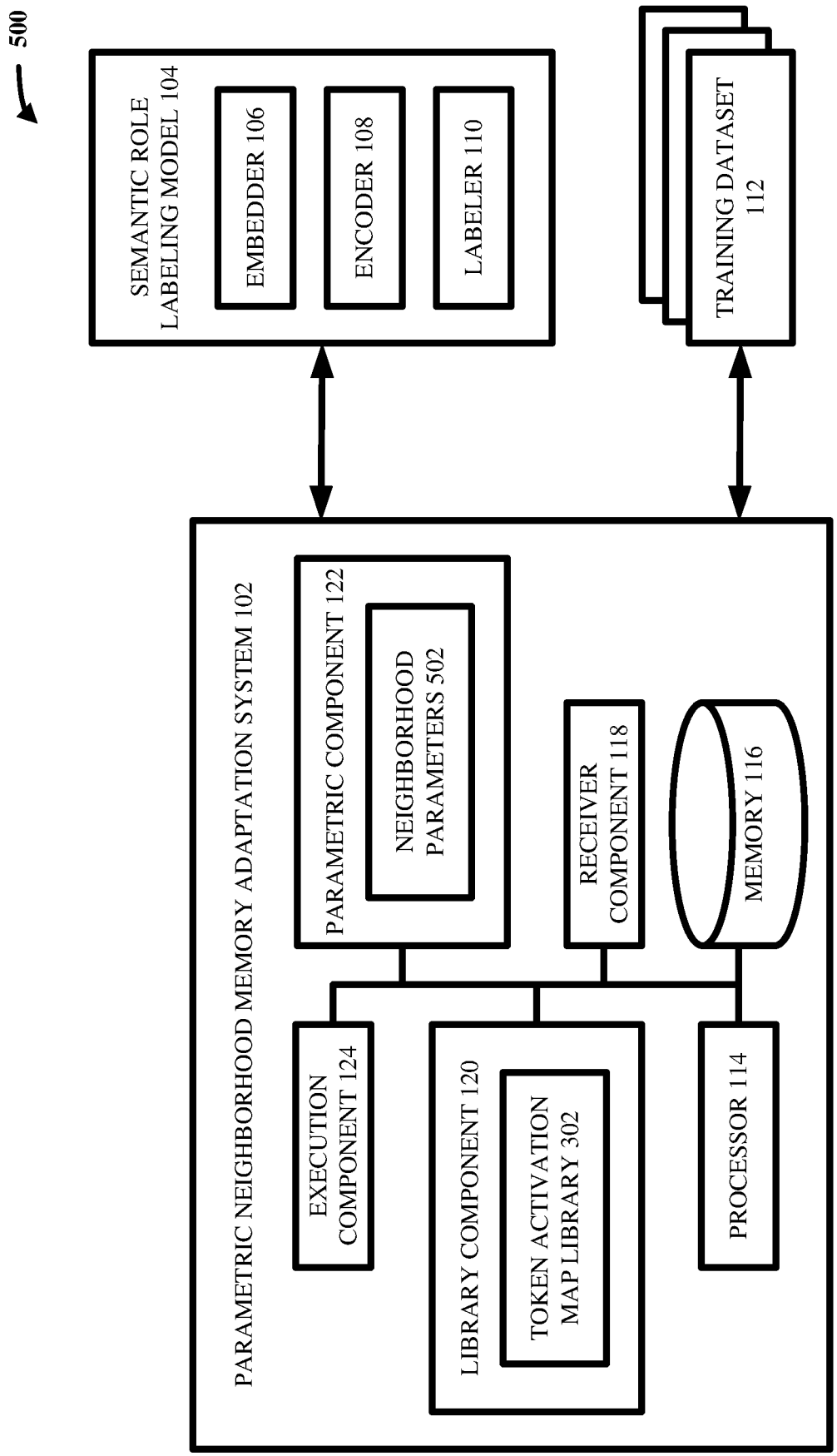
FIG. 5 illustrates a block diagram of an example, non-limiting system including neighborhood parameters that facilitates parameterized neighborhood memory adaptation for semantic role labeling in accordance with one or more embodiments described herein.

FIG. 5 illustrates a block diagram of an example, non-limiting system 500 including neighborhood parameters that can facilitate parameterized neighborhood memory adaptation for semantic role labeling in accordance with one or more embodiments described herein. As shown, the system 500 can, in some cases, comprise the same components as the system 300, and can further comprise neighborhood parameters 502.

In various embodiments, the parametric component 122 can electronically generate the neighborhood parameters 502. Specifically, the neighborhood parameters 502 can be a set of scalars, vectors, matrices, and/or tensors that are randomly initialized and that can be iteratively updated as described herein. In various cases, the token activation map library 302 and the neighborhood parameters 502 can be leveraged to help overcome the technical problem of low-frequency exceptions. Specifically, when the encoder 108 generates a token activation map, the parametric component 122 can identify nearest neighbors of that token activation map that are stored in the token activation map library 302, and the parametric component 122 can apply the neighborhood parameters 502 to the identified nearest neighbors so as to generate a neighborhood parametric representation of that token activation map. In various cases, such a neighborhood parametric representation can be considered as a combined ensemble of activation maps that are similar to the token activation map generated by the encoder 108. Accordingly, the neighborhood parametric representation can exhibit data patterns/distributions that are not exhibited by the token activation map generated by the encoder 108. Giving the labeler 110 access to such additional data patterns/distributions can enable the labeler 110 to more accurately generalize low-frequency exceptions, which is a concrete performance benefit. This is explained in more detail with respect to FIG. 6.

Figure 6:
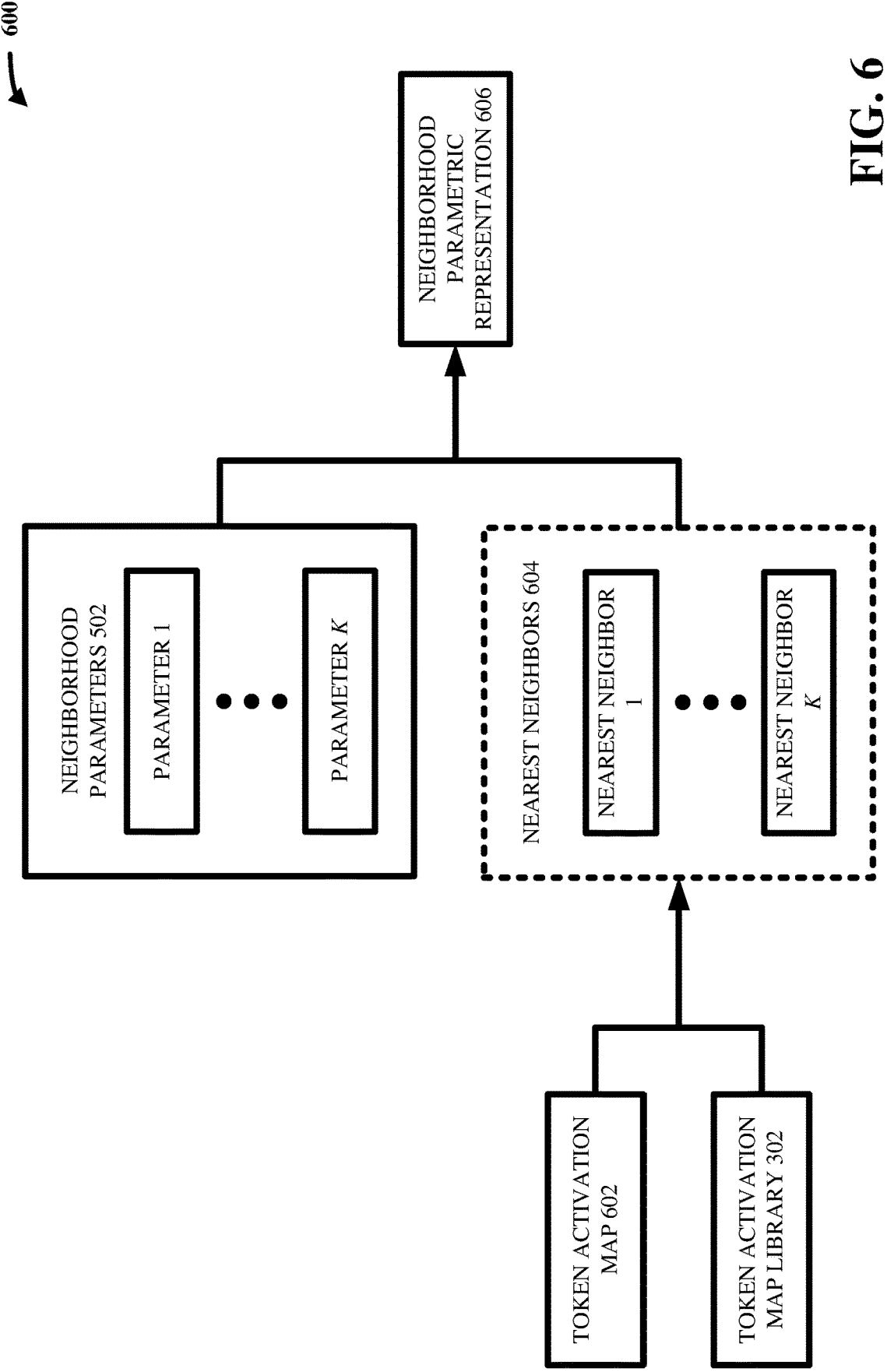
FIG. 6 illustrates an example, non-limiting block diagram showing how a token activation map library and neighborhood parameters can be used to generate a neighborhood parametric representation of a token activation map to facilitate parameterized neighborhood memory adaptation for semantic role labeling in accordance with one or more embodiments described herein.

FIG. 6 illustrates an example, non-limiting block diagram 600 showing how a token activation map library and neighborhood parameters can be used to generate a neighborhood parametric representation of a token activation map to facilitate parameterized neighborhood memory adaptation for semantic role labeling in accordance with one or more embodiments described herein.

As shown, in various embodiments, the neighborhood parameters 502 can include k parameters (e.g., parameter 1 to parameter k), for any suitable positive integer k. In some cases, the neighborhood parameters 502 can be randomly initialized scalars (e.g., parameter 1 can be a scalar with a randomly initialized value selected from any suitable numerical range, parameter k can be a scalar with a randomly initialized value selected from any suitable numerical range). In other cases, the neighborhood parameters 502 can be randomly initialized vectors, matrices, and/or tensors that have the same dimensionality as the token activation maps generated by the encoder 108 (e.g., parameter 1 can be a vector, matrix, and/or tensor with randomly initialized elements and with the same dimensionality as a token activation map, parameter k can be a vector, matrix, and/or tensor with randomly initialized elements and with the same dimensionality as a token activation map).

In various embodiments, a token activation map 602 can be generated by the encoder 108. In various instances, the parametric component 122 can identify nearest neighbors 604 based on the token activation map 602 and based on the token activation map library 302. More specifically, when given the token activation map 602, the parametric component 122 can identify in the token activation map library 302 k token activation maps that are similar to the token activation map 602, where such k token activation maps can be considered as the nearest neighbors 604 (e.g., nearest neighbor 1 to nearest neighbor k). In some cases, the parametric component 122 can identify the nearest neighbors 604 by computing Euclidean distances. For example, the parametric component 122 can compute the Euclidean distance between the token activation map 602 and every activation map stored in the token activation map library 302. The parametric component 122 can thus rank such computed Euclidean distances in order of magnitude, and the parametric component 122 can select as the nearest neighbors 604 the k activation maps stored in the token activation map library 302 that correspond to the k smallest Euclidean distances (e.g., there can be a smallest Euclidean distance between the token activation map 602 and the nearest neighbor 1, there can be a k-th smallest Euclidean distance between the token activation map 602 and the nearest neighbor k). As another example, the parametric component 122 can instead compute cosine similarities between the token activation map 602 and every activation map stored in the token activation map library 302 in order to identify the nearest neighbors 604.

In some embodiments, the token activation map library 302 can be collated by token. In such case, the parametric component 122 can refrain from computing Euclidean distances (and/or cosine similarities) between the token activation map 602 and every activation map stored in the token activation map library 302. Instead, the parametric component 122 can compute such Euclidean distances (and/or cosine similarities) between the token activation map 602 and only those activation maps stored in the token activation map library 302 that are based on the same token as the token activation map 602. For example, suppose that the token activation map library 302 includes various activation maps that are based on the token "kitchen" as used in various sentences in the training dataset 112, includes various activation maps that are based on the token "garage" as used in various sentences in the training dataset 112, and includes various activation maps that are based on the token "dining" as used in various sentences in the training dataset 112. Furthermore, suppose that the token activation map 602 is based on the token "garage." In such case, the parametric component 122 can compute Euclidean distances (and/or cosine similarities) between the token activation map 602 and each of the various activation maps stored in the token activation map library 302 that are also based on the token "garage." In other words, the parametric component 122 can refrain from searching through the activation maps that are based on the token "kitchen" or through the activation maps that are based on the token "dining," when the goal is to look for nearest neighbors of a token activation map that is based on the token "garage."

In any case, the parametric component 122 can identify the nearest neighbors 604 of the token activation map 602 by searching through the token activation map library 302.

In various embodiments, the parametric component 122 can then compute a neighborhood parametric representation 606 corresponding to the token activation map 602, by respectively combining the neighborhood parameters 502 with the nearest neighbors 604. In various aspects, the neighborhood parametric representation 606 can be equal to any suitable mathematical function of the neighborhood parameters 502 and the nearest neighbors 604. For example, in cases where the neighborhood parameters 502 are scalars, the neighborhood parametric representation 606 can be equal to the weighted sum formed by the neighborhood parameters 502 and the nearest neighbors 604 (e.g., the parameter 1 can be multiplied by the nearest neighbor 1, the parameter k can be multiplied by the nearest neighbor k, and such products can be summed). As another example, in cases where the neighborhood parameters 502 are vectors, matrices, and/or tensors, the neighborhood parameters 502 can be manipulated by any suitable mathematical functions (e.g., inner products) to create a set of k scalars, and such scalars can be used to compute a weighted sum of the nearest neighbors 604. For instance, in various embodiments, the token activation map 602 can be subtracted from each of the nearest neighbors 604, and the absolute value of such differences can be computed, thereby yielding k element-wise absolute differences (e.g., a first element-wise absolute difference equal to the absolute value of the difference between the nearest neighbor 1 and the token activation map 602, a k-th element-wise absolute difference equal to the absolute value of the difference between the nearest neighbor k and the token activation map 602). In such case, inner products between the neighborhood parameters 502 and such k element-wise absolute differences can be computed, thereby yielding k scalars (e.g., a first scalar equal to the inner product between the parameter 1 and the first element-wise absolute difference, a k-th scalar equal to the inner product between the parameter k and the k-th element-wise absolute difference). In various instances, such k scalars can then be used to compute a weighted sum of the nearest neighbors 604, thereby yielding the neighborhood parametric representation 606 (e.g., multiplying the nearest neighbor 1 by the first scalar, multiplying the nearest neighbor k by the k-th scalar, and adding all those products).

In any case, the parametric component 122 can mathematically combine in any suitable fashion the neighborhood parameters 502 with the nearest neighbors 604, with the resulting vector, matrix, and/or tensor being considered as the neighborhood parametric representation 606. Thus, FIG. 6 illustrates how the parametric component 122 can leverage the token activation map library 302 and the neighborhood parameters 502 to compute a neighborhood parametric representation (e.g., 606) when given a token activation map (e.g., 602) provided by the encoder 108.

As explained above, the neighborhood parameters 502 can be randomly initialized. In various cases, the neighborhood parameters 502 can be iteratively updated and/or learned, as explained with respect to FIGS. 7-9.

Figure 7:
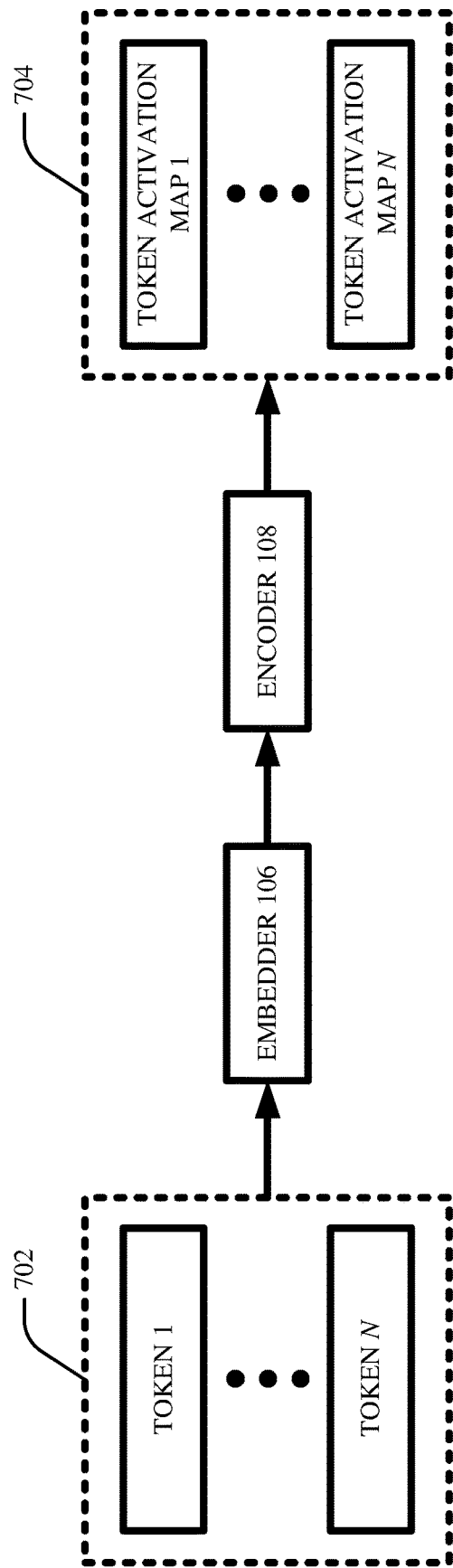
FIGS. 7-9 illustrate example, non-limiting block diagrams showing how neighborhood parameters can be learned to facilitate parameterized neighborhood memory adaptation for semantic role labeling in accordance with one or more embodiments described herein.
Figure 8:
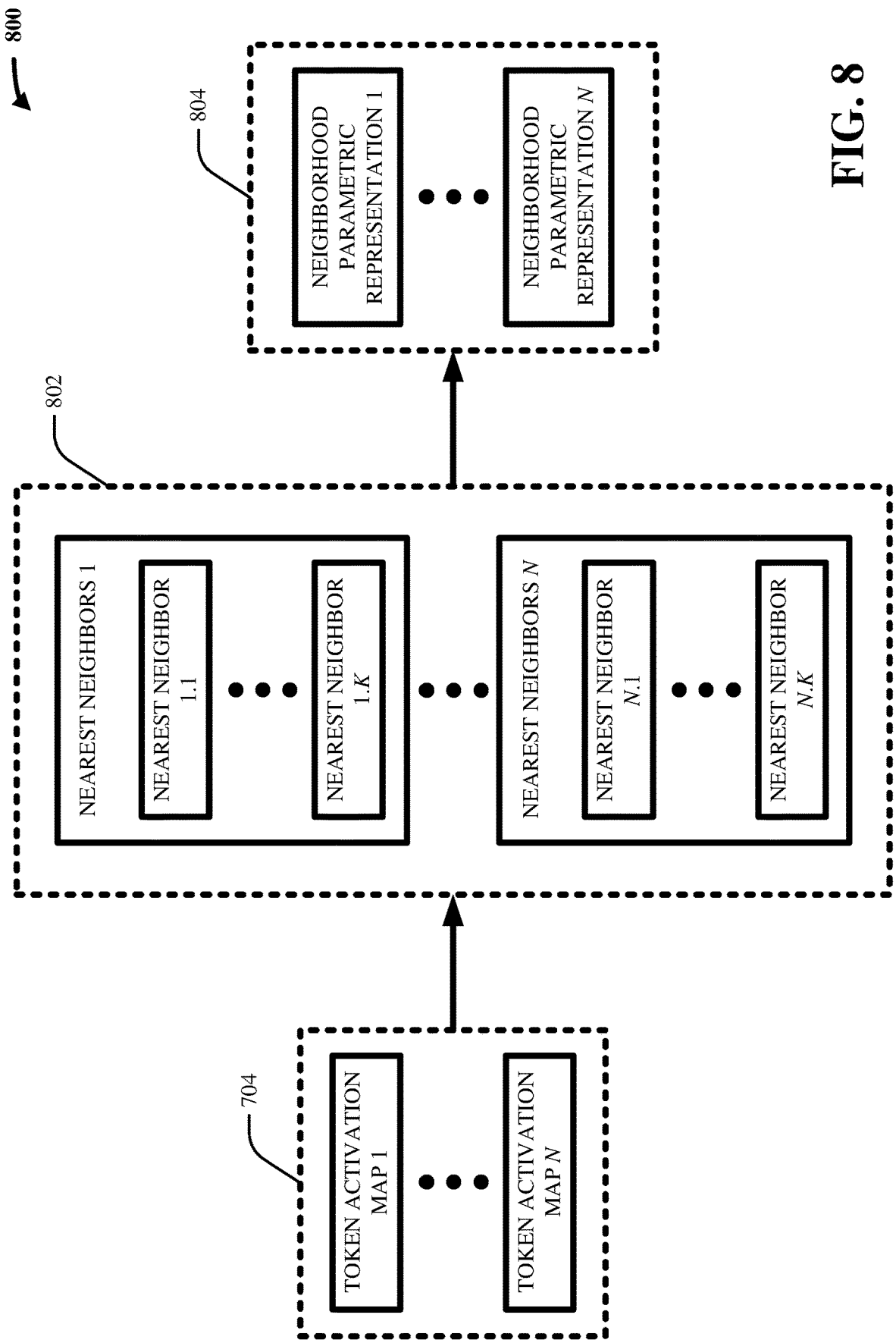
Figure 9:
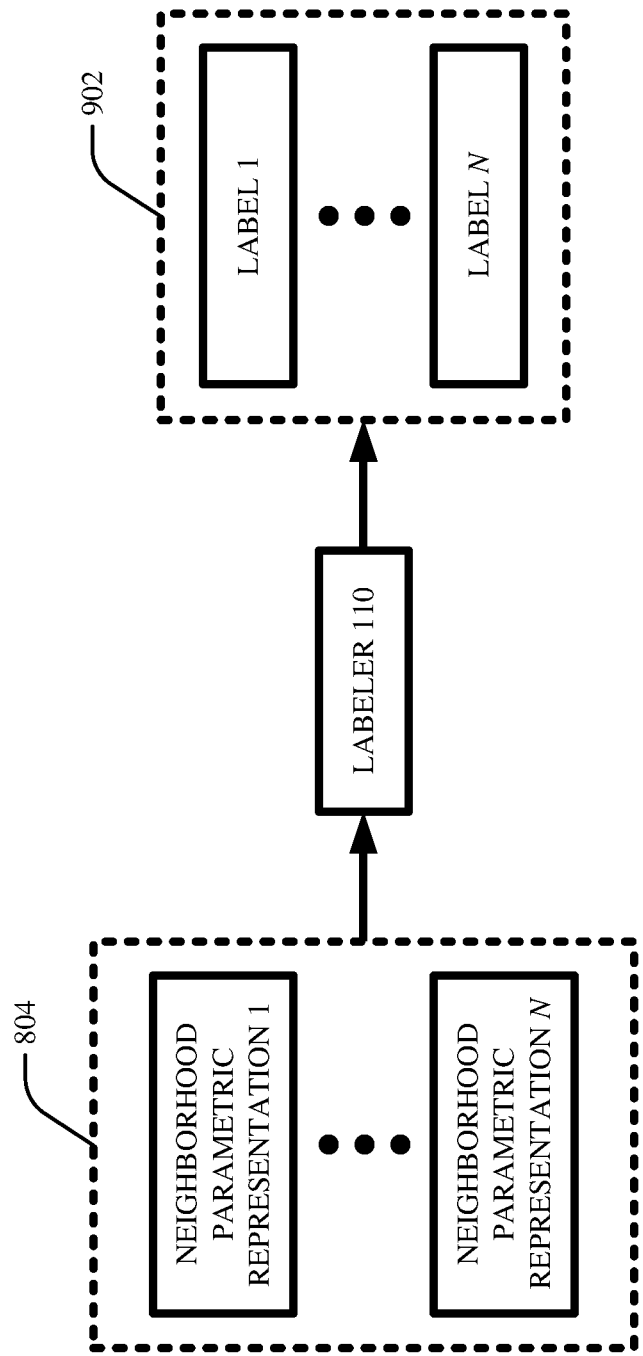

FIGS. 7-9 illustrate example, non-limiting block diagrams showing how neighborhood parameters can be learned to facilitate parameterized neighborhood memory adaptation for semantic role labeling in accordance with one or more embodiments described herein. In various cases, the FIGS. 7-9 illustrate how the execution component 124 and the parametric component 122 can work together to retrain the labeler 110 based on the neighborhood parameters 502.

First, consider FIG. 7. As shown, in various embodiments, the execution component 124 can feed a sentence 702 to the embedder 106. In various cases, the sentence 702 can comprise n tokens (e.g., token 1 to token n) for any suitable positive integer n. In various cases, the sentence 702 can be from the training dataset 112. As explained above, the embedder 106 can generate word embeddings (not shown) as output (e.g., n word embeddings for n tokens), which can be received as input by the encoder 108. As also explained above, the encoder 108 can generate token activation maps 704 based on the word embeddings (e.g., n token activation maps for n word embeddings and/or n tokens). As shown, in various embodiments, the execution component 124 can refrain from feeding the token activation maps 704 to the labeler 110. Instead, the parametric component 122 can operate on the token activation maps 704, as explained with respect to FIG. 8.

As shown in FIG. 8, in various embodiments, the parametric component 122 can identify nearest neighbors 802 in the token activation map library 302 based on the token activation maps 704. In other words, for each of the n token activation maps generated by the encoder 108 based on the sentence 702, the parametric component 122 can identify k nearest neighbors that are stored in the token activation map library 302, as explained above. For example, the parametric component 122 can identify k nearest neighbors of the token activation map 1 (e.g., nearest neighbor 1.1 to nearest neighbor 1.k) based on Euclidean distance and/or cosine similarity computations. Similarly, the parametric component 122 can identify k nearest neighbors of the token activation map n (e.g., nearest neighbor n.1 to nearest neighbor n.k) based on Euclidean distance and/or cosine similarity computations.

In various instances, the parametric component 122 can generate neighborhood parametric representations 804 based on the nearest neighbors 802, by applying the neighborhood parameters 502. That is, for each of the n token activation maps generated by the encoder 108 based on the sentence 702, the parametric component 122 can compute a neighborhood parametric representation by mathematically combining the k nearest neighbors of that token activation map with the k parameters of the neighborhood parameters 502, as described above (e.g., using the neighborhood parameters 502 to compute weighted sums of nearest neighbors). For example, the parametric component 122 can calculate the neighborhood parametric representation 1 based on the neighborhood parameters 502 and the k nearest neighbors of the token activation map 1 (e.g., nearest neighbor 1.1 to nearest neighbor 1.k). Likewise, the parametric component 122 can calculate the neighborhood parametric representation n based on the neighborhood parameters 502 and the k nearest neighbors of the token activation map n (e.g., nearest neighbor n.1 to nearest neighbor n.k).

As shown in FIG. 9, the execution component 124 can, in various embodiments, feed as input the neighborhood parametric representations 804 to the labeler 110, and the labeler 110 can accordingly output labels 902. As shown, the labels 902 can include n labels (e.g., the label 1 to the label n) that can respectively indicate and/or identify semantic roles of the n tokens in the sentence 702 (e.g., the label 1 can indicate the inferred semantic role of the token 1, the label n can indicate the inferred semantic role of the token n). Because the sentence 702 can be from the training dataset 112, the ground truth semantic roles of the n tokens in the sentence 702 can be known. Accordingly, the execution component 124 can compute losses and/or errors associated with the labels 902, and the execution component 124 can update via backpropagation both the neighborhood parameters 502 and the weights/biases of the labeler 110 based on such losses and/or errors. In various cases, the execution component 124 can refrain from updating and/or otherwise changing the weights/biases of the embedder 106 and/or the encoder 108 during this process.

In various cases, the procedure described above with respect to FIGS. 7-9 can be repeated for all (and/or fewer than all) of the sentences in the training dataset 112. As those having ordinary skill in the art will appreciate, in various cases, the updating of the neighborhood parameters 502 and/or the weights/biases of the labeler 110 can be performed on a sentence-by-sentence basis or on a batch basis, as desired. In any case, this can ultimately cause the neighborhood parameters 502 to become fully learned and/or updated.

In various aspects, once the neighborhood parameters 502 are fully learned and/or updated, the execution component 124 can execute the now-retrained SRL model 104 on any suitable sentence encountered in the field. Just as described above, the execution component 124 can feed such sentence to the embedder 106, which can cause the encoder 108 to generate a token activation map for each token in the sentence. Also as described above, the parametric component 122 can leverage the token activation map library 302 and the now fully learned and/or updated neighborhood parameters 502 to generate a neighborhood parametric representation for each token activation map provided by the encoder 108. The execution component 124 can then feed such neighborhood parametric representations to the now-retrained labeler 110, which can cause the labeler 110 to output labels indicating the semantic roles of the tokens in the sentence.

As mentioned above, the inventors of various embodiments of the invention empirically confirmed that implementation of the token activation map library 302 and the neighborhood parameters 502 as described herein can significantly improve the performance of the SRL model 104. What follows is a description of such empirical results as well as a particular non-limiting embodiment of the invention that was reduced to practice by the inventors.

SRL can be formulated as a sequence tagging problem both for span and dependency type arguments. For datasets with span style arguments, the semantic role can be converted to BIO tags (e.g., beginning-inside-outside tags). In various cases, it can be assumed that the input of an SRL model is a sentence S with n tokens, for any suitable positive integer n. Moreover, it can be assumed that the predicate position in a sentence is known. In other words, it can be assumed that each token in a sentence is tagged with a bit (e.g., 0 or 1) which indicates the predicate word.

In various cases, the SRL model 104 can be referred to as the base model and/or the base SRL model, after the SRL model 104 has been conventionally trained on the training dataset and before the SRL model 104 has been retrained and/or reconfigured based on the token activation map library 302 and/or the neighborhood parameters 502. In contrast, the SRL model 104 can be referred to as the retrained model and/or the retrained SRL model, after the SRL model 104 has been conventionally trained on the training dataset and after the SRL model 104 has been retrained and/or reconfigured based on the token activation map library 302 and/or the neighborhood parameters 502.

In various cases, the base model can comprise word embeddings (e.g., embedder 106), predicate embeddings (e.g., part of embedder 106), LSTM layers (e.g., encoder 108), connection layers (e.g., part of encoder 108), and a CRF layer (e.g., labeler 110). As mentioned above, word embeddings can be the numerical vector representations of textual words. In various cases, contextualized word embeddings can be implemented, such as ELMo and/or BERT. In various instances, the embedding of the n tokens of a sentence S can be denoted by $e_1, \ldots, e_n$. In various aspects, the marked predicate position of a sentence S can be used to obtain a predicate-specific word representation. In particular, the predicate indicator bits mentioned above can be mapped to dense embeddings $p_1, \ldots, p_n$. Accordingly, the combined embedding for a token i in a sentence S (e.g., for any suitable positive integer i) can be the concatenation $x_1^i = [e_i; p_i]$. In various cases, the base model can include alternating forward and backward LSTM layers, which can receive as input and sequentially process the concatenation $x_1^i = [e_i; p_i]$. In some cases, four of such LSTM layers can be implemented. In various aspects, the inputs of the l-th layer in the alternating LSTM layers can be denoted as $x_l^1, \ldots, x_l^n$, and the outputs of the l-th layer in the alternating LSTM layers can be denoted as $h_l^1, \ldots, h_l^n$. In various instances, to facilitate the flow of gradients between the LSTM layers, the input to the (l+1)-th layer can be $x_l^i = \text{ReLU}(W_l[h_l^i; x_l^i]) \in \mathbb{R}^d$, where d can be any suitable positive integer, and where $W_l$ can be any suitable weight matrix. In various cases, the final LSTM layer, denoted as layer L, can output $h_L = h_L^1, \ldots, h_L^n \in \mathbb{R}^d$, which output can be passed to the CRF layer, which can then produce a prediction for each of the n tokens in the sentence S.

In various cases, the base model can be conventionally trained on a training dataset (e.g., 112). In various cases, various embodiments of the invention can then proceed according to two phases: a library generation phase in which activation maps from the LSTM layers are recorded, and a parameterized neighborhood memory adaptation phase in which classification layers (e.g., CRF) of the base model are retrained based on parameterized vector representations of the tokens.

The inventors of various embodiments of the invention hypothesized that the k nearest neighbors, for any suitable positive integer k, of an activation map outputted by the LSTM layers contain valuable information about the correct label of a token w, even when $h_L$ (w) itself leads the classification layers of the base model to an incorrect prediction. To test this hypothesis, the inventors trained a base model on an available SRL dataset and computed the predicted labels for an available validation dataset. For each token w' that was mislabeled, k=64 nearest neighbors were computed, and the rank (in order of increasing distance) of the first token with the correct label of w' was calculated. The distribution of these ranks was graphed and was shown to be highly left-skewed. In other words, almost all tokens labeled incorrectly by the base model had a close neighbor that had the correct label. However, the inventors noted that it was unclear which neighbor of the token w' to trust. Based on these observations, the inventors of various embodiments of the invention devised the two phases described herein: library generation, and parameterized neighborhood memory adaptation.

In the library generation phase, the inventors populated a library with activation maps $h_L(w)$ produced by the final LSTM layer on words w in the training dataset. This library (e.g., also referred to as a memory) can be denoted as M={$h_L$ (w)}, where w is in the training dataset. Those having ordinary skill in the art will appreciate that M can have any suitable size.

In the parameterized neighborhood memory adaptation phase, the following can be performed. For any token w in the training set, the k activation maps that are stored in the library M that are nearest to $h_L(w)$ can be identified (e.g., via Euclidean distance and/or cosine similarity computations). Such k activation maps can be referred to as the k nearest neighbors of $h_L(w)$. In various cases, the i-th nearest neighbor of $h_L(w)$ can be denoted as $m_i(w) \in \mathbb{R}^d$, and the set of nearest neighbor vectors of $h_L(w)$ can be denoted as the neighborhood $N_k(w)$. To exploit the information contained in the neighborhood $N_k(w)$, a parameterized compact representation of the neighborhood $N_k(w)$ can be computed. Specifically, let $\{n_i \in \mathbb{R}^d, \text{ for } 1 \leq i \leq k\}$ denote a set of neighborhood parameters (e.g., 502) that can be learned during training. Consider the following quantity: $\{\eta_i(w)\}_{i=1}^k = \text{softmax}\{n_i \cdot |m_i(w) - h_L(w)|\}_{i=1}^k$. Here, $|m_i(w) - h_L(w)|$ can represent the element-wise absolute difference between $m_i(w)$ and $h_L(w)$, which can be considered as a dense representation of the separation between $h_L(w)$ and its i-th nearest neighbor. The inner product of $|m_i(w) - h_L(w)|$ with $n_i$, followed by a softmax function, can compute a distribution $\{\eta_i(w)\}_{i=1}^k$ over the k nearest neighbors. This distribution can then be used to compute a compact weighted representation of $N_k(w)$, denoted as $n_k(w)$. Specifically, the following can be implemented: $n_k(w) = \sum_{i=1}^k \eta_i(w) m_i(w) \in \mathbb{R}^d$. In other words, the neighborhood parameters $\{n_i \in \mathbb{R}^d, \text{ for } 1 \leq i \leq k\}$ can be used to compute scalars $\{\eta_i(w)\}_{i=1}^k$, which scalars can be used to compute a weighted sum of the nearest neighbors $N_k(w)$.

In various instances, it can be instructive to contrast $h_L(w)$ with $n_k(w)$. The former can be considered as the representation of w produced by the base model, while the latter can be considered as a compact combination of an ensemble of k representations in M that are close to $h_L(w)$. By making $n_k(w)$ a function of $|m_i(w) - h_L(w)|$ and the learnable neighborhood parameters $\{n_i \in \mathbb{R}^d, \text{ for } 1 \leq i \leq k\}$, the most relevant information from the k nearest neighbors $N_k(w)$ can be extracted.

In various embodiments, the parameters (e.g., weights and/or biases) associated with the LSTM, connection, and/or embedding layers of the base model can be frozen, and both the neighborhood parameters $\{n_i \in \mathbb{R}^d, \text{ for } 1 \leq i \leq k\}$ and the weights/biases of the classification layers can be updated using $n_k(w)$ and the known ground truth label of w in the training dataset. After this phase of training (e.g., which can be considered as retraining of the classification layers of the base model), the resulting SRL model can be considered as the final model and/or the retrained model. By creating a parameterized representation (e.g., $n_k(w)$) of the nearest neighbors $N_k(w)$, the final model can make optimal use of the information contained in the nearest neighbors.

The inventors of various embodiments of the invention experimentally verified the improved performance of such a finalized and/or retrained model. Specifically, the inventors evaluated the final/retrained model on both span style and dependency style semantic parsing datasets. In such experiments, both randomly initialized embeddings as well as pre-trained contextual embeddings (e.g., ELMo and/or BERT) were implemented. In the contextual embedding cases, the inventors used a scaled convex combination of embeddings of the underlying language model. The inventors used embeddings of size 50 to map the predicate indicator bits. Each LSTM layer had a hidden dimension of 300. Moreover, an Adam optimizer having 100 epochs and an initial learning rate of 0.001 was used to optimize the loss function. The learning rate was decreased by half after epoch 50 and 75. An L2 weight decay of 0.0001 was used for regularization. Moreover, a dropout of $\delta_1 \in \{0.05, 0.1, 0.15\}$ after each LSTM layer and a dropout of $\delta_e \in \{0.45, 0.5, 0.55\}$ after each word embedding layer was applied. Furthermore, the inventors implemented 1024 dimensions for randomly initialized word embeddings, which is the same as for ELMo and BERT. For the PNMA phase of training, the inventors used k=64 nearest neighbors for each token, and retraining of the classification layers was conducted for 20 epochs with a constant learning rate of 0.0004. For each dataset on which the finalized/retrained model was tested, a library M was generated, where the library M had 15% of the tokens that were present in the dataset.

The results of such experiments showed improved performance metrics. Specifically, span SRL results demonstrated improved F1 scores ranging from 0.1 to 1.8 F1 points for all test cases. Indeed, such results demonstrated that implementation of PNMA as described herein can result in SRL performance that rivals syntax-aware SRL models. Furthermore, dependency SRL results demonstrated improved F1 scores ranging from 0.5 to 5.2 F1 points for all test cases. Again, such results demonstrated that implementation of PNMA as described herein can result in SRL performance that rivals syntax-aware SRL models.

For all datasets that were experimentally evaluated by the inventors, it was shown that the finalized/retrained model was almost four times more likely to change a wrong prediction of the base model into a correct prediction than it is to change a correct prediction of the base model into a wrong prediction. In cases where the base model disagreed with the finalized/retrained model, the finalized/retrained model was three to four times more likely to be correct. Moreover, it was shown that disagreement between the base model and the finalized/retrained model was significantly higher for predicates that were infrequent in the training datasets. In other words, the finalized/retrained model was better able to correctly label low-frequency exceptions as compared to the base model.

Figure 10:
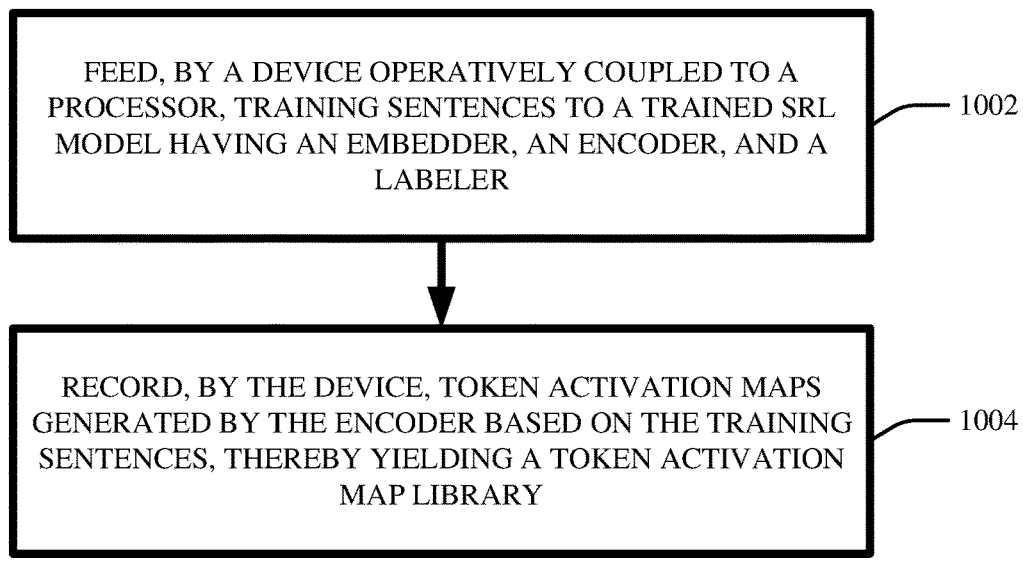
FIGS. 10-12 illustrate flow diagrams of example, non-limiting computer-implemented methods that facilitate parameterized neighborhood memory adaptation for semantic role labeling in accordance with one or more embodiments described herein.
Figure 11:
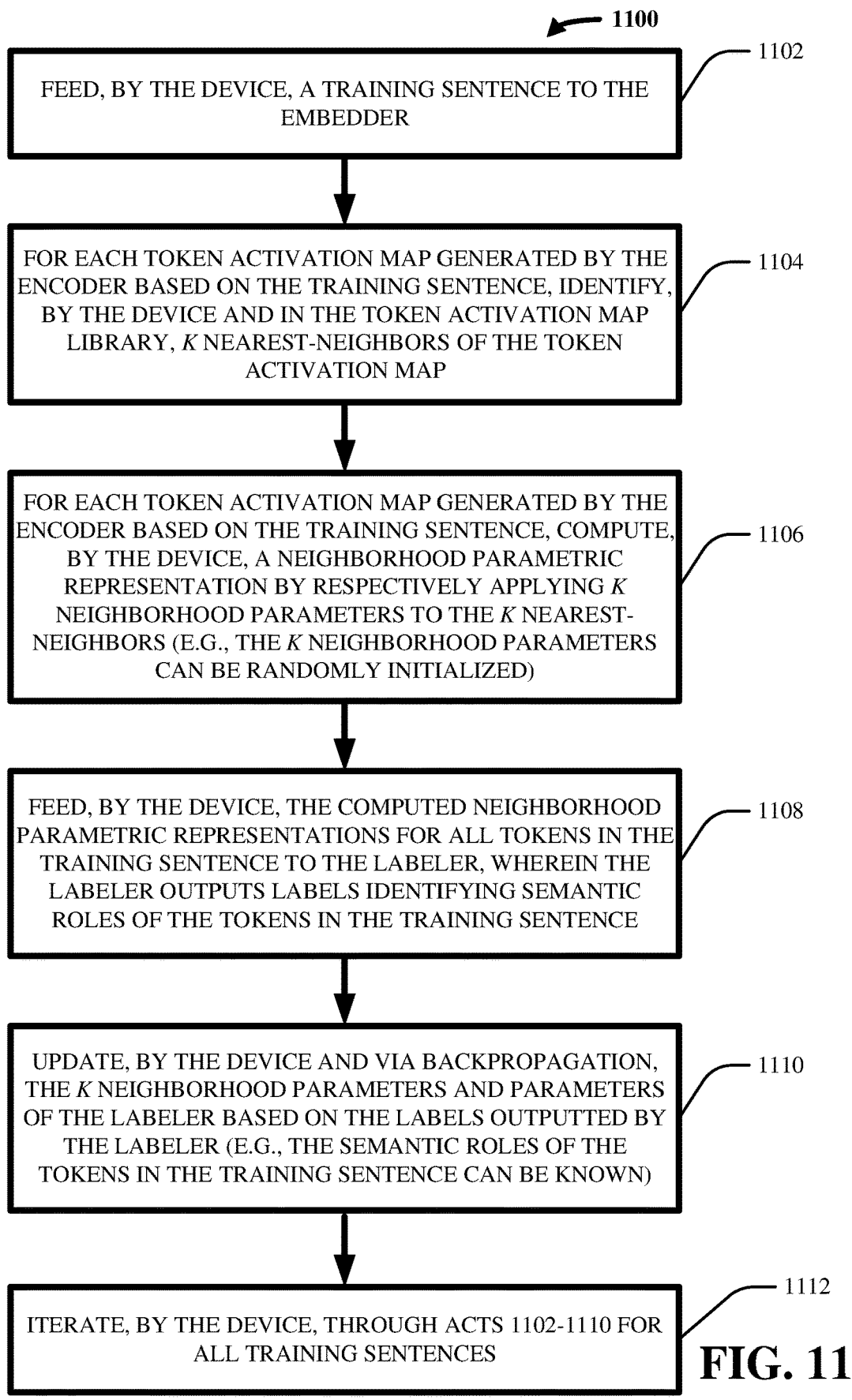
Figure 12:
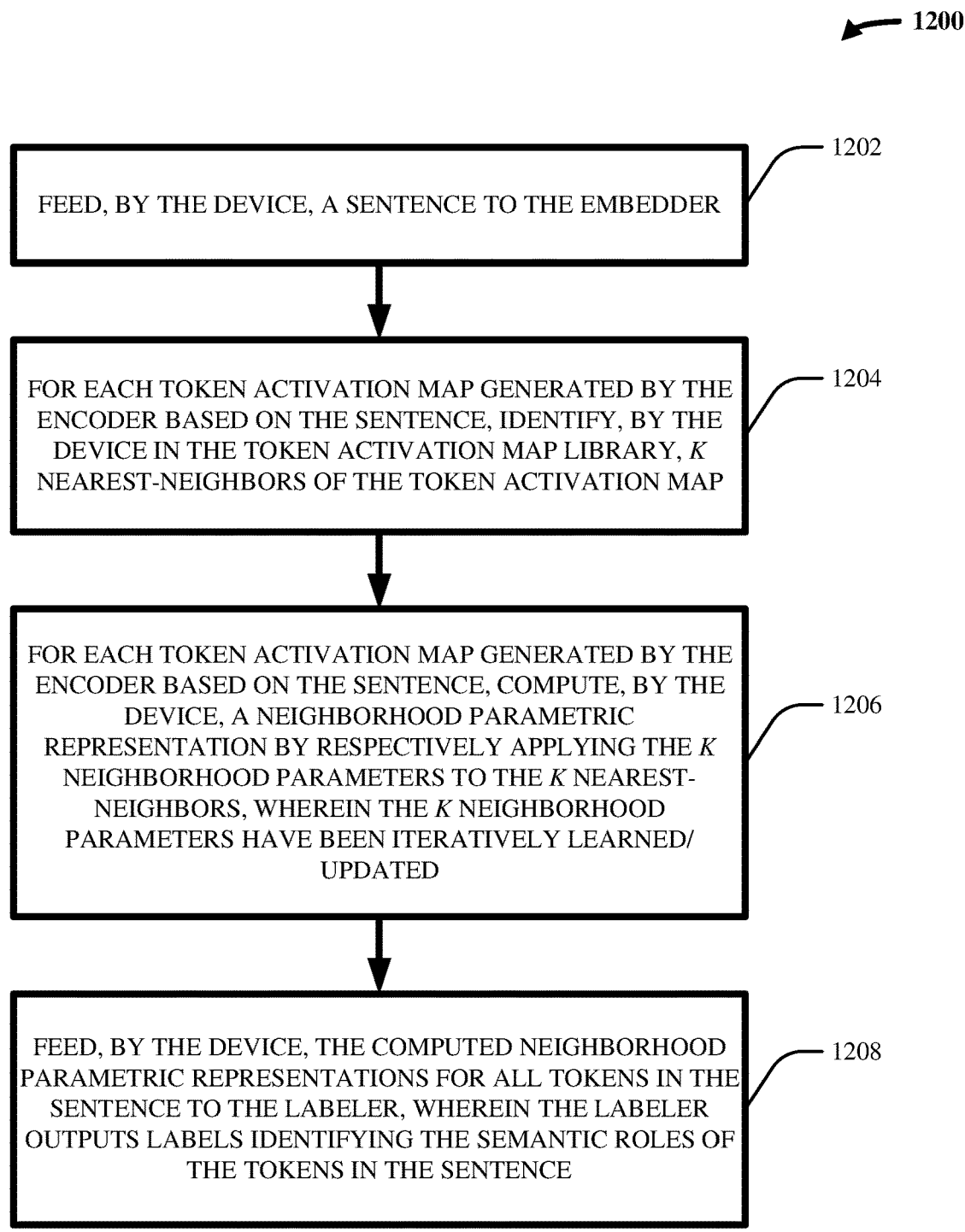

FIGS. 10-12 illustrate flow diagrams of example, non-limiting computer-implemented methods 1000-1200 that can facilitate parameterized neighborhood memory adaptation for semantic role labeling in accordance with one or more embodiments described herein. In various cases, the computer-implemented methods 1000-1200 can be facilitated by the PNMA system 102.

First, consider the computer-implemented method 1000. In various embodiments, act 1002 can include feeding, by a device (e.g., via the library component 120) operatively coupled to a processor, training sentences (e.g., the training sentence 402) to a trained SRL model (e.g., the SRL model 104) having an embedder (e.g., the embedder 106), an encoder (e.g., the encoder 108), and a labeler (e.g., the labeler 110).

In various aspects, act 1004 can include recording, by the device (e.g., via the library component 120), token activation maps (e.g., the encoder output 406) generated by the encoder based on the training sentences, thereby yielding a token activation map library (e.g., the token activation map library 302).

Next, consider the computer-implemented method 1100. In various embodiments, act 1102 can include feeding, by the device (e.g., via the execution component 124), a training sentence (e.g., the sentence 702) to the embedder (e.g., the embedder 106).

In various aspects, act 1104 can include, for each token activation map (e.g., one of the token activation maps 704) generated by the encoder (e.g., the encoder 108) based on the training sentence, identifying, by the device (e.g., via the parametric component 122) and in the token activation map library (e.g., the token activation map library 302), k nearest neighbors (e.g., k of the nearest neighbors 802) of the token activation map.

In various instances, act 1106 can include for each token activation map generated by the encoder based on the training sentence, computing, by the device (e.g., via the parametric component 122), a neighborhood parametric representation (e.g., one of the neighborhood parametric representations 804) by respectively applying k neighborhood parameters (e.g., the neighborhood parameters 502) to the k nearest neighbors. In various cases, the k neighborhood parameters can be randomly initialized.

In various embodiments, act 1108 can include feeding, by the device (e.g., via the execution component 124), the computed neighborhood parametric representations for all tokens in the training sentence to the labeler (e.g., the labeler 110), wherein the labeler can output labels identifying semantic roles of the tokens in the training sentence (e.g., one label per token).

In various aspects, act 1110 can include updating, by the device (e.g., via the execution component 124 and/or the parametric component 122) and via backpropagation, the k neighborhood parameters and parameters of the labeler, based on the labels outputted by the labeler. In various cases, the semantic roles of the tokens in the training sentence can be known.

In various instances, act 1112 can include iterating, by the device (e.g., via the execution component 124 and/or the parametric component 122) through acts 1102-1110 for all training sentences (e.g., for all sentences in the training dataset 112). Those having ordinary skill in the art will appreciate how to implement the computer-implemented method 1100 in a batch training style, if desired.

Finally, consider the computer-implemented method 1200. In various embodiments, act 1202 can include feeding, by the device (e.g., via the execution component 124) a sentence to the embedder (e.g., the embedder 106).

In various aspects, act 1204 can include, for each token activation map generated by the encoder (e.g., the encoder 108) based on the sentence, identifying, by the device (e.g., via the parametric component 122) in the token activation map library (e.g., the token activation map library 302), k nearest neighbors of the token activation map.

In various instances, act 1206 can include, for each token activation map generated by the encoder based on the sentence, computing, by the device (e.g., via the parametric component 122), a neighborhood parametric representation by respectively applying the k neighborhood parameters (e.g., the neighborhood parameters 502) to the k nearest neighbors, wherein the k neighborhood parameters have been iteratively learned/updated.

In various aspects, act 1208 can include feeding, by the device (e.g., via the execution component 124), the computed neighborhood parametric representations for all tokens in the sentence to the labeler (e.g., the labeler 110), wherein the labeler can output labels identifying the semantic roles of the tokens in the sentence (e.g., one label per token).

Figure 13:
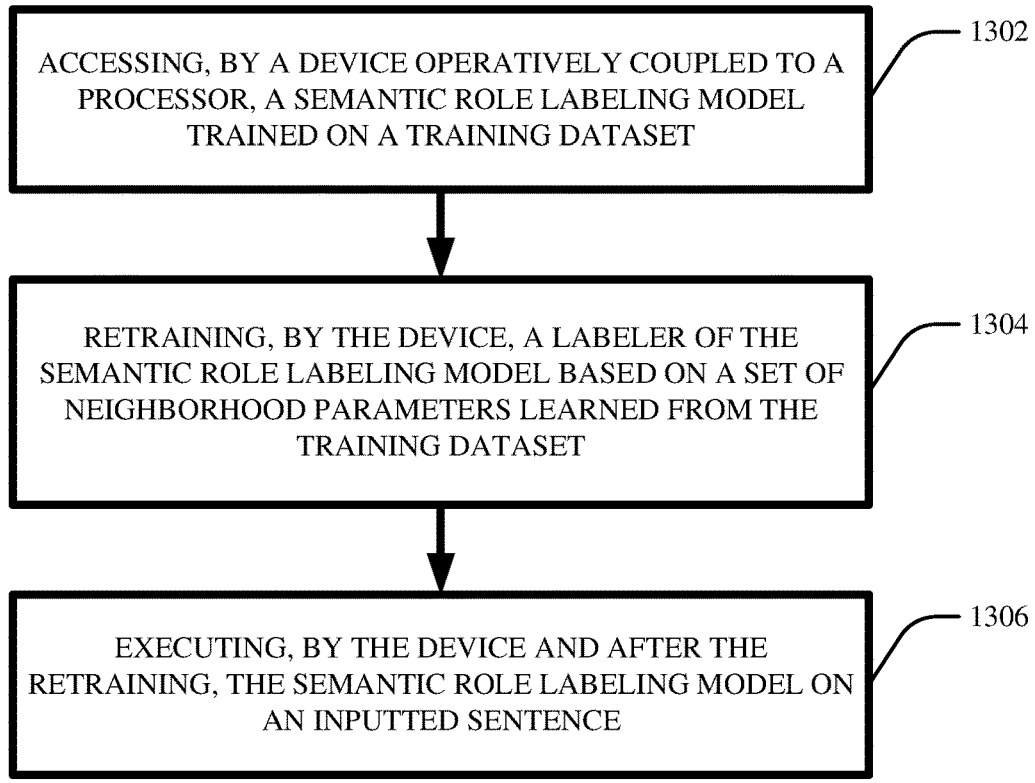
FIG. 13 illustrates a flow diagram of an example, non-limiting computer-implemented method that facilitates parameterized neighborhood memory adaptation for semantic role labeling in accordance with one or more embodiments described herein.

FIG. 13 illustrates a flow diagram of an example, non-limiting computer-implemented method 1300 that can facilitate parameterized neighborhood memory adaptation for semantic role labeling in accordance with one or more embodiments described herein.

In various embodiments, act 1302 can include accessing, by a device (e.g., via the receiver component 118) operatively coupled to a processor, a semantic role labeling model (e.g., the SRL model 104) trained on a training dataset (e.g., the training dataset 112).

In various aspects, act 1304 can include retraining, by the device (e.g., via the execution component 124) a labeler (e.g., the labeler 110) of the semantic role labeling model based on a set of neighborhood parameters (e.g., the neighborhood parameters 502) learned from the training dataset.

In various instances, act 1306 can include executing, by the device (e.g., via the execution component 124) and after the retraining, the semantic role labeling model on an inputted sentence.

Although not explicitly shown in FIG. 13, the labeler can receive as input a function of the set of neighborhood parameters.

Although not explicitly shown in FIG. 13, the computer-implemented method 1300 can further comprise: storing, by the device (e.g., via the library component 120), a library (e.g., the token activation map library 302) of token activation maps that are generated by an encoder (e.g., the encoder 108) of the semantic role labeling model based on the training dataset.

Although not explicitly shown in FIG. 13, the encoder can generate a first token activation map (e.g., the token activation map 602) based on a first token in the training dataset, and the computer-implemented method 1300 can further comprise: identifying, by the device (e.g., via the parametric component 122) and in the library, one or more first nearest neighbors (e.g., the nearest neighbors 604) of the first token activation map; and computing, by the device (e.g., via the parametric component 122), a first neighbor parametric representation (e.g., the neighborhood parametric representation 606) by applying the set of neighborhood parameters to the one or more first nearest neighbors. In various cases, the first neighborhood parametric representation can be based on a sum of the one or more first nearest neighbors weighted by the set of neighborhood parameters. In various instances, the set of neighborhood parameters can be iteratively updated during retraining of the labeler.

Various embodiments of the invention include a computerized tool that can retrain and/or reconfigure an SRL model based on a token activation map library and a set of learnable neighborhood parameters, such that the SRL model can exhibit improved performance with respective to low-frequency exceptions. In various cases, when given a set of labeled training data, an SRL model can be conventionally trained. In various cases, the computerized tool described herein can populate a library of the training dataset, where the library comprises token activation maps for all and/or some of the tokens in the training dataset, where such token activation maps are generated by an encoder of the SRL model. In various instances, when given the library, the computerized tool can identify nearest neighbors that are stored in the library of any given token activation map provided by the encoder, such as via Euclidean distance computations. Alternatively, such nearest neighbors can be identified via probabilistic methods, such as locality sensitivity hashing. When given the nearest neighbors of a token activation map, the computerized tool can compute a compact parameterized vector that is a function of the nearest neighbors and a set of learnable neighborhood parameters. In various cases, the computerized tool can retrain a labeler of the SRL model based on such learnable neighborhood parameters. Alternatively, in some cases, an attention-type mechanism can be used to selectively attend to the set of nearest neighbors. Such a computerized tool does not require labels for nearest neighbors, does not implement a fixed and/or rigid parametric representation, does not involve hand-crafted features, does not require dependency on a syntactic parser, and can cause an SRL model to exhibit improved semantic role labeling accuracy, which is a concrete and tangible technical improvement.

Those having ordinary skill in the art will appreciate that the herein disclosure describes non-limiting examples of various embodiments of the invention. For ease of description and/or explanation, various portions of the herein disclosure utilize the term "each" when discussing various embodiments of the invention. For example, the herein disclosure refers in various places to "each token," to "each token activation map," and/or to "each neighborhood parametric representation," among other such usages of the term "each." Those having ordinary skill in the art will appreciate that such usages of the term "each" are non-limiting examples. Accordingly, if the herein disclosure states that, in various embodiments, some action and/or process can be applied to "each token," it should be understood that, in various embodiments, such action and/or process can be applied to fewer than each token (e.g., can be applied to one or more tokens). Similarly, if the herein disclosure states that, in various embodiments, some action and/or process can be applied to "each token activation map," it should be understood that, in various embodiments, such action and/or process can be applied to fewer than each token activation map (e.g., can be applied to one or more token activation maps). Likewise, if the herein disclosure states that, in various embodiments, some action and/or process can be applied to "each neighborhood parametric representation," it should be understood that, in various embodiments, such action and/or process can be applied to fewer than each neighborhood parametric representation (e.g., can be applied to one or more neighborhood parametric representations). In other words, when the herein disclosure provides a description that is applied to "each" of some particular computerized object, it should be understood that this is a non-limiting example of various embodiments of the invention, and it should be further understood that, in various other embodiments of the invention, it can be the case that such description applies to fewer than "each" of that particular computerized object.

Figure 14:
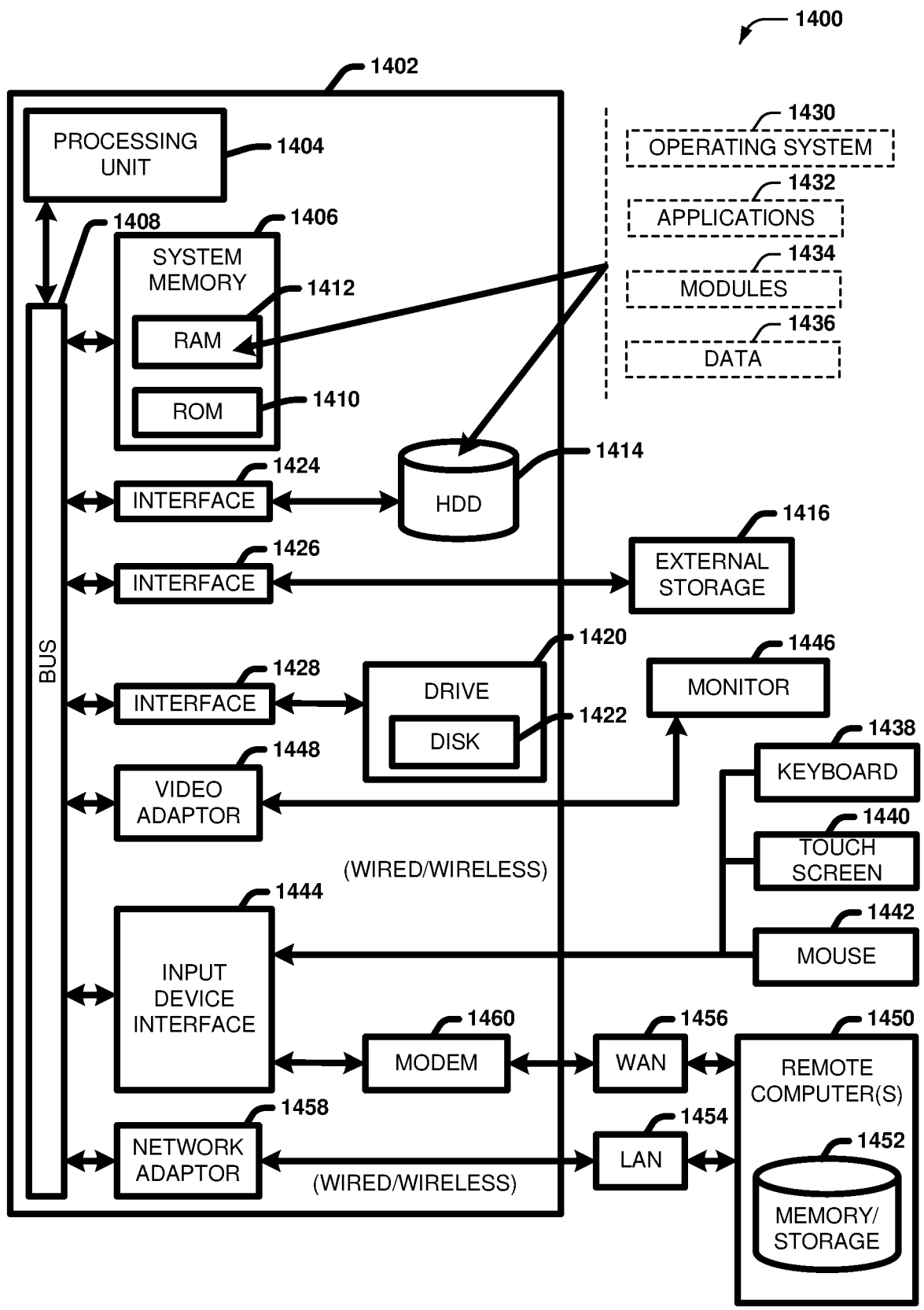
FIG. 14 illustrates a block diagram of an example, non-limiting operating environment in which one or more embodiments described herein can be facilitated.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, and/or data structures that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader) and a drive 1420, e.g., such as a solid state drive, an optical disk drive, which can read or write from a disk 1422, such as a CD-ROM disc, a DVD, and/or a BD. Alternatively, where a solid state drive is involved, disk 1422 would not be included, unless separate. While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and drive 1420 can be connected to the system bus 1408 by an HDD interface 1424, an external storage interface 1426 and a drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, and/or a BLUETOOTH® interface.

A monitor 1446 or other type of display device can be also connected to the system bus 1408 via an interface, such as a video adapter 1448. In addition to the monitor 1446, a computer typically includes other peripheral output devices (not shown), such as speakers and/or printers.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above, such as but not limited to a network virtual machine providing one or more aspects of storage or processing of information. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
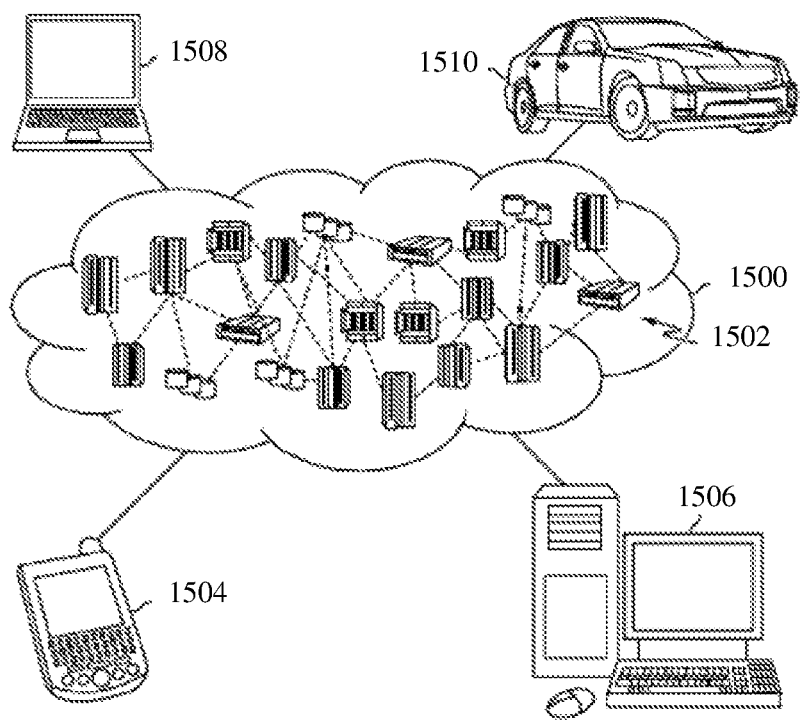
FIG. 15 illustrates an example, non-limiting cloud computing environment in accordance with one or more embodiments described herein.

Referring now to FIG. 15, illustrative cloud computing environment 1500 is depicted. As shown, cloud computing environment 1500 includes one or more cloud computing nodes 1502 with which local computing devices used by cloud consumers, such as, for example, personal digital assistant (PDA) or cellular telephone 1504, desktop computer 1506, laptop computer 1508, and/or automobile computer system 1510 may communicate. Nodes 1502 may communicate with one another. They may be grouped (not shown) physically or virtually, in one or more networks, such as Private, Community, Public, or Hybrid clouds as described hereinabove, or a combination thereof. This allows cloud computing environment 1500 to offer infrastructure, platforms and/or software as services for which a cloud consumer does not need to maintain resources on a local computing device. It is understood that the types of computing devices 1504-1510 shown in FIG. 15 are intended to be illustrative only and that computing nodes 1502 and cloud computing environment 1500 can communicate with any type of computerized device over any type of network and/or network addressable connection (e.g., using a web browser).

Figure 16:
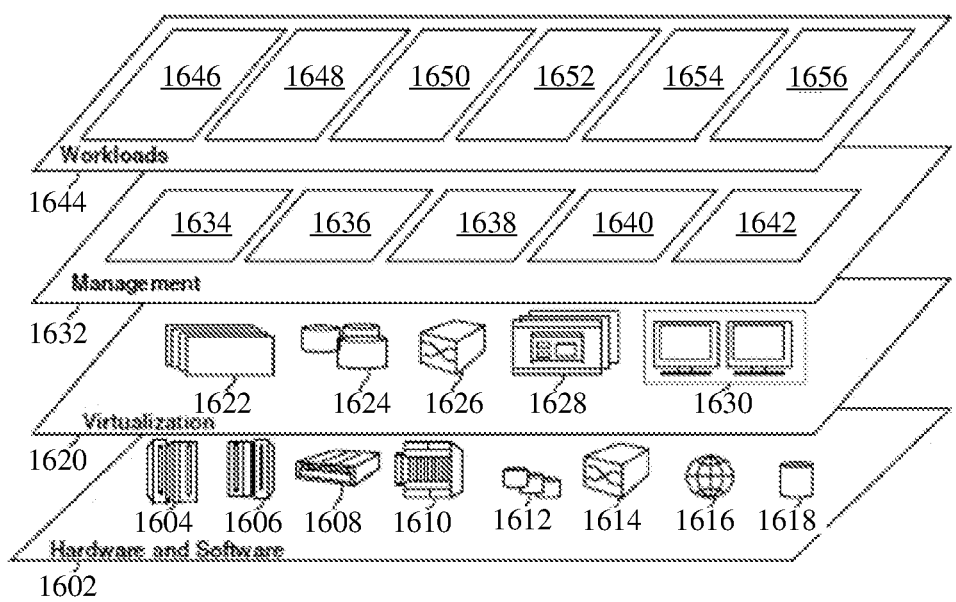
FIG. 16 illustrates example, non-limiting abstraction model layers in accordance with one or more embodiments described herein.

Referring now to FIG. 16, a set of functional abstraction layers provided by cloud computing environment 1500 (FIG. 15) is shown. Repetitive description of like elements employed in other embodiments described herein is omitted for sake of brevity. It should be understood in advance that the components, layers, and functions shown in FIG. 16 are intended to be illustrative only and embodiments of the invention are not limited thereto. As depicted, the following layers and corresponding functions are provided.

Hardware and software layer 1602 includes hardware and software components. Examples of hardware components include: mainframes 1604; RISC (Reduced Instruction Set Computer) architecture based servers 1606; servers 1608; blade servers 1610; storage devices 1612; and networks and networking components 1614. In some embodiments, software components include network application server software 1616 and database software 1618.

Virtualization layer 1620 provides an abstraction layer from which the following examples of virtual entities may be provided: virtual servers 1622; virtual storage 1624; virtual networks 1626, including virtual private networks; virtual applications and operating systems 1628; and virtual clients 1630.

In one example, management layer 1632 may provide the functions described below. Resource provisioning 1634 provides dynamic procurement of computing resources and other resources that are utilized to perform tasks within the cloud computing environment. Metering and Pricing 1636 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1638 provides access to the cloud computing environment for consumers and system administrators. Service level management 1640 provides cloud computing resource allocation and management such that required service levels are met. Service Level Agreement (SLA) planning and fulfillment 1642 provide pre-arrangement for, and procurement of, cloud computing resources for which a future requirement is anticipated in accordance with an SLA.

Workloads layer 1644 provides examples of functionality for which the cloud computing environment may be utilized. Examples of workloads and functions which may be provided from this layer include: mapping and navigation 1646; software development and lifecycle management 1648; virtual classroom education delivery 1650; data analytics processing 1652; transaction processing 1654; and differentially private federated learning processing 1656. Various embodiments of the present invention can utilize the cloud computing environment described with reference to FIGS. 15 and 16 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, and/or data structures, that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like.

The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components; and
   a processor that executes at least one of the computer-executable components that:
      trains, via a first training process using a training dataset, a labeler of a semantic role labeling model to perform natural language processing of natural language inputs in the training dataset, wherein the training comprises training the labeler of the semantic role labeling model to assign labels to tokens of the natural language inputs; and
      retrains, via a second training process using a set of neighborhood parameters of the semantic role labeling model learned from the training dataset, the labeler to more accurately than the first training process assign labels to low-frequency exception tokens of the training dataset, wherein the retraining comprises:
         generating a library comprising respective token activation maps for a group of tokens selected from the tokens of the natural language inputs of the training dataset resulting in a group of token activation maps;
         for respective token activation maps of the group of token activation maps:
            identifying a subgroup of token activation maps from the group of token activation maps that are nearest neighbors to the token activation map according to a defined criterion, and
            generating a neighborhood parametric representation for the token activation map by combining the subgroup of token activation maps using the set of neighborhood parameters; and
         inputting the neighborhood parametric representations to the labeler as part of the retraining.

2. The system of claim 1, wherein generating the token activation map for a token comprises generating a token embedding based on a sentence of the natural language inputs from which the token was extracted.

3. The system of claim 2, wherein the token is a word.

4. The system of claim 1, wherein the neighborhood parametric representation is based on a sum of the subgroup of token activation maps weighted by the set of neighborhood parameters.

5. The system of claim 1, wherein the at least one of the computer-executable components further:
   iteratively updates, during the retraining of the labeler, the set of neighborhood parameters.

6. The system of claim 1, wherein the at least one of the computer-executable components further:
   executes, after the retraining, the semantic role labeling model on an inputted sentence that is not part of the training dataset.

7. The system of claim 1, wherein the set of neighborhood parameters comprises at least one of weights or biases of the semantic role labeling model.

8. A computer-implemented method, comprising:
   training, by a device operatively coupled to a processor, via a first training process using a training dataset, a labeler of a semantic role labeling model to perform natural language processing of natural language inputs in the training dataset, wherein the training comprises training the labeler of the semantic role labeling model to assign labels to tokens of the natural language inputs; and
   retraining, by the device, via a second training process using a set of neighborhood parameters of the semantic role labeling model learned from the training dataset, the labeler to more accurately than the first training process assign labels to low-frequency exception tokens of the training dataset, wherein the retraining comprises:
      generating a library comprising respective token activation maps for a group of tokens selected from the tokens of the natural language inputs of the training dataset resulting in a group of token activation maps;
      for respective token activation maps of the group of token activation maps:
         identifying a subgroup of token activation maps from the group of token activation maps that are nearest neighbors to the token activation map according to a defined criterion, and
         generating a neighborhood parametric representation for the token activation map by combining the subgroup of token activation maps using the set of neighborhood parameters; and
      inputting the neighborhood parametric representations to the labeler as part of the retraining.

9. The computer-implemented method of claim 8, wherein generating the token activation map for a token comprises generating a token embedding based on a sentence of the natural language inputs from which the token was extracted.

10. The computer-implemented method of claim 9, wherein the token is a word.

11. The computer-implemented method of claim 8, wherein the neighborhood parametric representation is based on a sum of the subgroup of token activation maps weighted by the set of neighborhood parameters.

12. The computer-implemented method of claim 8, wherein the set of neighborhood parameters are iteratively updated during the retraining of the labeler.

13. The computer-implemented method of claim 8, further comprising:
   executing, by the device and after the retraining, the semantic role labeling model on an inputted sentence that is not part of the training dataset.

14. The computer-implemented method of claim 8, wherein the set of neighborhood parameters comprises at least one of weights or biases of the semantic role labeling model.

15. A computer program product for facilitating parameterized neighborhood memory adaptation, the computer program product comprising a non-transitory computer-readable medium having program instructions embodied therewith, the program instructions executable by a processor to cause the processor to:
   train, via a first training process using a training dataset, a labeler of a semantic role labeling model to perform natural language processing of natural language inputs in the training dataset, wherein the training comprises training the labeler of the semantic role labeling model to assign labels to tokens of the natural language inputs; and
   retrain, via a second training process using a set of neighborhood parameters of the semantic role labeling model learned from the training dataset, the labeler to more accurately than the first training process assign labels to low-frequency exception tokens of the training dataset, wherein the retraining comprises:
generating a library comprising respective token activation maps for a group of tokens selected from the tokens of the natural language inputs of the training dataset resulting in a group of token activation maps;
for respective token activation maps of the group of token activation maps:
identifying a subgroup of token activation maps from the group of token activation maps that are nearest neighbors to the token activation map according to a defined criterion, and
generating a neighborhood parametric representation for the token activation map by combining the subgroup of token activation maps using the set of neighborhood parameters; and
inputting the neighborhood parametric representations to the labeler as part of the retraining.

16. The computer program product of claim 15, wherein generating the token activation map for a token comprises generating a token embedding based on a sentence of the natural language inputs from which the token was extracted.

17. The computer program product of claim 16, wherein the token is a word.

18. The computer program product of claim 15, wherein the neighborhood parametric representation is based on a sum of the subgroup of token activation maps weighted by the set of neighborhood parameters.

19. The computer program product of claim 15, wherein the set of neighborhood parameters are iteratively updated during the retraining of the labeler.

20. The computer program product of claim 15, wherein the program instructions are executable by the processor to further cause the processor to:
execute, after the retraining, the semantic role labeling model on an inputted sentence that is not part of the training dataset.

* * * * *